US007705839B2

(12) United States Patent
Murade

(10) Patent No.: US 7,705,839 B2

(45) Date of Patent: Apr. 27, 2010

(54) DRIVING CIRCUIT FOR ELECTRO-OPTICAL DEVICE, DRIVING METHOD OF ELECTRO-OPTICAL DEVICE, ELECTRO-OPTICAL DEVICE, AND ELECTRONIC APPARATUS

(75) Inventor: Masao Murade, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 1285 days.

(21) Appl. No.: 11/187,930

(22) Filed: Jul. 25, 2005

(65) Prior Publication Data

US 2006/0044296 A1 Mar. 2, 2006

(30) Foreign Application Priority Data

Aug. 27, 2004 (JP) ............................ 2004-248818
Jun. 14, 2005 (JP) ............................ 2005-173174

(51) Int. Cl.
*G09G 5/00* (2006.01)
*G06F 3/038* (2006.01)
*G09G 3/36* (2006.01)
*G09G 3/30* (2006.01)
*G09G 3/32* (2006.01)

(52) U.S. Cl. ........................... 345/204; 345/76; 345/82; 345/98; 345/99; 345/100

(58) Field of Classification Search ......... 345/204–206, 345/691, 76–83, 87–104
See application file for complete search history.

(56) References Cited

U.S. PATENT DOCUMENTS

| | | | | |
|---|---|---|---|---|
| 5,959,600 | A | 9/1999 | Uchino et al. | |
| 6,417,847 | B1 | 7/2002 | Mametsuka | |
| 6,670,943 | B1 | 12/2003 | Ishii et al. | |
| 7,224,341 | B2 | 5/2007 | Ishii et al. | |
| 2004/0150610 | A1* | 8/2004 | Zebedee et al. | 345/100 |
| 2004/0257351 | A1* | 12/2004 | Ishii | 345/204 |
| 2005/0206608 | A1* | 9/2005 | Murade | 345/103 |
| 2006/0267913 | A1* | 11/2006 | Mochizuki et al. | 345/100 |

FOREIGN PATENT DOCUMENTS

| | | |
|---|---|---|
| JP | A 07-295520 | 11/1995 |
| JP | A-10-105126 | 4/1998 |
| JP | A-11-218738 | 8/1999 |
| JP | A-2000-162577 | 6/2000 |
| JP | A-2004-109985 | 4/2004 |

* cited by examiner

*Primary Examiner*—Alexander S Beck
(74) *Attorney, Agent, or Firm*—Oliff & Berridge, PLC

(57) ABSTRACT

A driving circuit for an electro-optical device drives an electro-optical device having a plurality of data lines and a plurality of scanning lines extending to cross each other, and a plurality of pixel electrodes arranged in an image display region corresponding to intersections of the data lines and the scanning lines. The driving circuit for an electro-optical device includes a shift register that has stages each of which generates transfer signals for defining writing timing and sequentially outputs the transfer signals from the respective stages, a precharge supply line that supplies a precharge timing signal for defining precharge timing ahead of the writing timing, and a data line circuit that receives the timing signal, shapes the timing signal on the basis of at least the transfer signal, and drives the plurality of data lines according to the timing signal.

10 Claims, 16 Drawing Sheets

DRIVING CIRCUIT FOR ELECTRO-OPTICAL DEVICE, DRIVING METHOD OF ELECTRO-OPTICAL DEVICE, ELECTRO-OPTICAL DEVICE, AND ELECTRONIC APPARATUS

BACKGROUND OF THE INVENTION

1. Technical Field

The present invention relates to a driving circuit for an electro-optical device which is installed in an electro-optical device, such as a liquid crystal device or the like, to a driving method of an electro-optical device, to an electro-optical device, and to an electronic apparatus having such an electro-optical device.

2. Related Art

An electro-optical device of this kind, for example, a liquid crystal device, has a pair of substrates disposed to face each other with liquid crystal interposed therebetween. A plurality of pixel electrodes are arranged in an image display region. Further, scanning lines and data lines that are correspondingly connected to the pixel electrodes, a scanning line driving circuit for driving the scanning lines, and a data line driving circuit for driving the data lines are provided on one of the substrates. When driving, a sampling circuit in the data line driving circuit samples image signals on image signal lines and supplies the sampled signals to the data lines. The image signals are supplied to the pixel electrode via the data lines.

As a driving method, an inversion driving method is adopted in order to prevent burning or aging of liquid crystal. That is, the voltage level of the image signal applied to each pixel electrode is changed on the basis of an intermediate potential of the voltage amplitude to invert the polarity of a liquid crystal driving voltage. However, a time delay occurs in the actual potential change of each data line due to parasitic capacitance of the data line itself. Accordingly, prior to the polarity inversion of the image signal, a precharge operation for charging or discharging the data line to the potential of the polarity after the inversion is performed. Specifically, a precharge signal having a predetermined potential level corresponding to a gray-scale color is written into each data line.

When the precharge operation is introduced, the electro-optical device is constituted such that the data lines receive the image signals from one end thereof by the data line driving circuit arranged at one end and receive the precharge signal from the other end thereof by a precharge circuit arranged at the other end (for example, see Japanese Unexamined Patent Application Publication No. 7-295520)

However, if the circuits are provided at both ends of the data lines in such a manner, a region for relaying wiring lines is required, and thus there is a technical problem in that it is difficult to reduce the size of the substrate or the entire device.

However, a method has been suggested in which the precharge signal is applied to the image signal lines, and thus the precharge signal is inserted between effective image signals which are used for writing and wiring lines for supplying the signals to the data line are integrally formed with the image signal lines. In this case, however, the circuit for supplying the precharge signal is incorporated, and thus there is a technical problem in that the circuit layout cannot be made minute since the number of elements in the data line driving circuit is increased. Further, the circuit for supplying the precharge signal is also incorporated, and thus writing timing of each data line may be deviated, which results in deteriorating display quality.

SUMMARY

An advantage of the invention is that it provides a driving circuit for an electro-optical device which can realize a minute circuit layout and high-quality display, a driving method of an electro-optical device, an electro-optical device to which such a driving circuit for an electro-optical device is applied, and an electronic apparatus.

According to a first aspect of the invention, there is provided a driving circuit for an electro-optical device which drives an electro-optical device having a plurality of data lines and a plurality of scanning lines extending to cross each other, and a plurality of pixel electrodes arranged in an image display region corresponding to intersections of the data lines and the scanning lines. The driving circuit for an electro-optical device includes a shift register that has stages each of which generates transfer signals for defining writing timing and sequentially outputs the transfer signals from the respective stages, a precharge supply line that supplies a precharge timing signal for defining precharge timing ahead of the writing timing, and a data line circuit that receives the timing signal, shapes the timing signal based on at least the transfer signal, and drives the plurality of data lines according to the timing signal.

In accordance with the first aspect of the invention, the driving circuit for an electro-optical device has a ‘video precharge’ (precharging is performed with the same operation as that of data writing) configuration. At the time of driving, the precharge operation is performed before data writing. The precharge operation means a control for charging or discharging the data line and for setting the potential of the data line close to an image signal potential in advance, thereby preventing incomplete writing. The precharge operation is performed simultaneously for a plurality of data lines or respectively for each data line according to the precharge timing described below. More specifically, at the time of data writing, the data line is electrically connected to the image signal line with the write timing. Further, at the time of precharging, the data line is electrically connected to the image signal line with timing to be precharged. In a case of the latter, the precharge signal, not the image signal, is sent to the image signal line. As a result, the precharge signal is applied to the data line, such that the potential of the data line is ensured.

Operation timing at the time of writing or at the time of precharging is controlled in accordance with a transfer signal outputted from a shift register and a timing signal outputted from a precharge circuit. Here, the precharge circuit is provided in the back of the shift register and in front of the data line circuit. Further, if any one of the transfer signal or the precharge timing signal is inputted, a signal having a waveform corresponding to the waveform of the input signal is outputted. Such a precharge circuit generally has a plurality of OR circuits, which are arranged for the transfer signals, respectively. That is, the precharge circuit serves as a switch for introducing the precharge timing signal to the path of the transfer signal and outputs a timing signal corresponding to the transfer signal at the time of data writing. On the other hand, the precharge circuit outputs a timing signal corresponding to the precharge timing signal at the time of precharging. Here, two kinds of timing signals are inputted to the data line circuit together, such that the operation timing of the data lines are controlled in different periods based on the respective timing signals. Moreover, the transfer signals from the shift register are ‘sequentially’ outputted from the respective stages, but this means that the transfer signals are outputted from the respective stage continuously. The time series of the transfer signals does not necessarily correspond to the physical arrangement of the respective stages.

In the data line circuit, for example, with an enable circuit described below, the timing signal based on at least the transfer signal is shaped. At this time, the waveform of the timing signal is processed. If the precharge circuit is inserted into the data line circuit, at that time, the timing signal based on the transfer signal must pass through the precharge circuit, such that, during or after shaping, the signal is delayed or distorted. For this reason, the waveform of a control signal to be finally outputted is influenced, and thus the deviation in the time series of drive timing of the data line or the variation between the data lines occurs, which causes a bad effect, such as display spots or the like, at the time of data writing.

On the other hand, in accordance with the first aspect of the invention, as described above, the precharge circuit is disposed in the back of the shift register or in front of the data line circuit, and thus the influence on the transfer signal by the precharge circuit can be eliminated through the shaping process in the data line circuit. Accordingly, high-quality display can be realized.

In the driving circuit for an electro-optical device according to the first aspect of the invention, the data line circuit may include an enable supply line that supplies an enable signal having a predetermined pulse width narrower than the timing signal outputted based on at least the transfer signal and an enable circuit to which the timing signal outputted from the precharge circuit and the enable signal are inputted and that outputs the timing signal having a pulse width limited to the predetermined pulse width.

According to this configuration, two kinds of the timing signals are inputted to the enable circuit from the precharge circuit. Here, the precharge circuit is provided in front of the enable circuit, and thus the precharge timing signal is inputted to the sampling circuit through the enable circuit, like the transfer signal. That is, the enable circuit is basically provided to limit the pulse width of the transfer signal to the pulse width of the enable signal for the sake of making the pulse width of the transfer signal constant and improving a driving frequency. Here, the precharge timing signal is also inputted thereto.

Specifically, the enable circuit has an AND circuit to which the timing signal and the enable signal are inputted and performs trimming on the transfer signal on the basis of the waveform of the enable signal to define the final output waveform thereof. If the precharge circuit is inserted into the enable circuit or in the back of the enable circuit, the timing signal outputted based on the transfer signal must go though the precharge circuit, and thus a delay or a distortion occurs until the data line is finally driven.

On the contrary, according to this configuration, as describe above, the waveform of the timing signal depends on the waveform of the enable signal, and thus the precharge circuit provided in front of the enable circuit almost or practically has no influence on the timing signal to be finally outputted. Accordingly, high-quality display can be realized.

In the driving circuit for an electro-optical device according to the first aspect of the invention, the data line circuit may include a first enable supply line that supplies plural series of first enable signals having a first pulse width narrower than that of the timing signal outputted based on at least the transfer signal, a second enable supply line that supplies one series of second enable signals having a second pulse width narrower than the first pulse width, and an enable circuit to which the timing signal and the first and second enable signals are inputted and that shapes respective pulses of the timing signal on the basis of the plural series of first enable signals to limit the pulse width of the timing signal to the first pulse width, and shapes all pulses of the timing signal on the basis of the one series of second enable signals after being limited to the first pulse width to limit the pulse width of the timing signal to the second pulse width.

According to this configuration, the timing signal inputted to the enable circuit is processed in two steps on the basis of two enable signals, that is, the first and second enable signals.

Generally, the transfer signal is shaped by the plural series of enable signals in the enable circuit serving as a unit for realizing high frequency. That is, the pulse width of the transfer signal is limited by the narrow pulse width of the plural series of enable signals. Here, the 'plural series' means that signal generation sources or supply paths, such as a plurality of enable signal generating circuits or a plurality of enable signal supply paths that has the same configuration or different configurations and are provided separately from one another, are different from one another. The enable signals that finally overlap one another to be treated as one continuous signal are included. In such a case, even when the enable signals are intended to have originally the same waveform, the waveform might be different slightly due to the characteristics of circuit elements or the electrical influence of elements or wiring lines. The plural series of enable signals can be treated as independent signals from one another, and thus one transfer signal can be time-divided to be supplied to a plurality of signal lines.

Only with waveform shaping using the plural series of enable signals, a display inconsistency due to the series difference may occur. For example, the pulse shape of the enable signal is reflected in the writing time to the data line, and thus the difference in pulse width between the series clearly exists as the luminance difference, which results in deteriorating display quality (specifically, luminance spots of vertical stripe shapes corresponding to the series cycle appear).

Therefore, the enable circuit according to the above-described configuration is constituted to shape the timing signal by the plural series of enable signals and then to shape the timing signal by the one series of enable signals again. The enable signals of the latter are supplied from the second enable supply line and, for example, have the final output waveform of the timing signal. Moreover, here, the 'one series' means that the generation sources or supply paths thereof are the same. In such a case, the widths or intervals (that is, frequency) of the pulses of the signals are made constant. As compared with at least the plural series of enable signals, the pulse widths of the same series of the enable signals are drastically made constant. With shaping of the two steps, the pulse width of the timing signal is made uniform. That is, the change by the series difference of the pulse width of the timing signal generated in the first step can be solved in the second step. Moreover, the pulse width (that is, 'second pulse width') of the one series of enable signals is smaller than the pulse width of the plural series of enable signals since the timing signal having the pulse width limited to the pulse width (that is, 'first pulse width') of the plural series of enable signals is shaped.

As such, if at least two steps of shaping are performed using the plural series of enable signals and the one series of enable signals, it is possible to obtain a timing signal of which the pulse width is finally made uniform. Alternatively, if two steps of shaping are performed, the pulse width of the timing signal to be finally outputted can be drastically made constant, as compared with the case in which waveform shaping is performed only using the plural series of enable signals of the first step.

According to this configuration, at the time of the shaping process of the timing signal based on the transfer signal, even when the plural series of enable signals are used, the luminance spot due to the series difference of the enable signals does almost or practically not occur.

Such a shaping process may be performed on the timing signal based on at least the transfer signal but may be performed on the timing signal on the basis of the precharge timing signal by adjusting the width of the enable signal. In such a case, the potential variation between the data lines after precharging, which is caused by the series difference of the enable signals, is reduced. As a result, at the time of subsequent data writing, the writing variation is suppressed, such that high-quality display can be realized with reduced display spots.

Moreover, according to this configuration, at least two steps of shaping described above are required, but, for example, the same shaping process may be further performed. In that case, however, the shaping process by the one series of enable signals is required to be performed finally.

In the driving circuit for an electro-optical device according to the first aspect of the invention, the precharge circuit may have a plurality of precharge switches provided corresponding to the respective stages, and the data line circuit may be commonly and electrically connected to the precharge switches and may be plurally divided on the basis of unit circuits that are branched into m series (where m is a natural number of two or more) to be electrically connected to m data lines among the plurality of data lines.

According to this configuration, the data line circuit that is in the back of the precharge circuit has plural series of unit circuits that are separately controlled on the basis of the common timing signal. That is, the timing signal may be supplied for every plural series, and thus the precharge switch is also provided for every plural series. Therefore, the number of circuits can be drastically reduced as compared with the case in which the circuits are provided corresponding to the data lines.

Such multi series is generally performed so as to reduce the number of the wiring lines or elements relating to the output of the transfer signal from the shift register and to reduce the writing variation for each data line. If the precharge timing signal is inputted collectively for each series, the number of the wiring lines and elements relating to the precharge circuit can be reduced or the precharge deviation can be reduced.

In the driving circuit for an electro-optical device according to the first aspect of the invention, the transfer signal may be directly inputted to the precharge circuit from the shift register.

According to this configuration, there is no part between the precharge circuit and the shift register, and thus the transfer signal and the precharge timing signal are regarded as the same timing signal and then can be sent to the same circuit after precharging. That is, here, ‘direct input’ means that the output of the shift register is inputted as it is without passing through other parts of other elements or the like.

For this reason, the above-described multi series can be implemented with a relatively simple circuit configuration. Further, the amount of delay or distortion between the transfer signal and the precharge timing signal can be aligned, and thus it is advantageous to control the timing.

In the driving circuit for an electro-optical device according to the first aspect of the invention, the precharge circuit may have a plurality of NOR circuits that are provided corresponding to the respective stages.

According to this configuration, the precharge circuit has the NOR circuits, and thus the number of the elements in the precharge circuit can be reduced, such that the layout can be made minute. Further, the number of the elements is reduced, and thus the delay or distortion of the timing signal can be suppressed.

In the driving circuit for an electro-optical device according to the first aspect of the invention, the precharge circuit may be disposed close to the shift register along one side of the image display region.

According to this configuration, the shift register and the precharge circuit are arranged close to each other along one side of the image display region. Generally, the wiring lines and the elements are arranged with a relatively high density in the data line circuit or in the periphery thereof, since the switching elements corresponding to the data lines, a plurality of enable supply lines or the image signal lines are formed. On the contrary, the region adjacent to the shift register has a relatively low density since wiring lines or elements, excluding the output wiring line of the transfer signal, are almost not provided. For this reason, the precharge circuit is made close to the shift register, and thus it is advantageous for the circuit layout.

According to a second aspect of the invention, an electro-optical device includes the above-described driving circuit for an electro-optical device according to the first aspect of the invention (including various configurations described above), a plurality of data lines and a plurality of scanning lines, and a plurality of pixel electrodes.

In accordance with the second aspect of the invention, the electro-optical device includes the above-described driving circuit for an electro-optical device according to the first aspect of the invention. Therefore, the circuit layout can be made minute and high-quality display can be realized. The electro-optical device can implement various display devices, such as a liquid crystal device, an organic electroluminescent device, an electrophoretic device, such as an electronic paper or the like, a display device using an electron emission element (Field Emission Display and Surface-Conduction Electron-Emitter Display), or the like.

According to a third aspect of the invention, an electronic apparatus includes the above-described electro-optical device according to the second aspect of the invention (including various configurations described above).

In accordance with the third aspect of the invention, the electronic apparatus includes the above-described electro-optical device according to the second aspect of the invention. Therefore, high-quality display can be realized and the circuit layout can be made minute. The electronic apparatus can be implemented as various display devices, such as a liquid crystal device, an electrophoretic device, such as an electronic paper or the like, a display device using an electron emission element (Field Emission Display and Surface-Conduction Electron-Emitter Display), or various apparatuses, such as a projection-type or reflection-type projector, a television set, a cellular phone, an electronic organizer, a word processor, a view finder-type or monitor-direct-view-type video tape recorder, a work station, a video phone, a POS terminal, a touch panel, or the like.

According to a fourth aspect of the invention, there is provided a driving method of an electro-optical device which is applied to the above-described driving circuit for an electro-optical device according to the first aspect of the invention. The driving method of an electro-optical device includes causing the shift register to sequentially output the transfer signal for defining writing timing, causing the precharge supply line to supply the precharge timing signal for defining precharge timing ahead of write timing, causing the precharge circuit to output an input signal as the timing signal when any one of the precharge timing signal and the transfer signal is inputted, causing the data line circuit to shape the timing signal outputted based on at least the transfer signal, and causing the data line circuit to drive the plurality data line according to the timing signal.

Further, in the driving method of an electro-optical device according to the fourth aspect of the invention, in causing the data line circuit to shape, the data line circuit may be supplied with an enable signal having a predetermined pulse width narrower than that of the timing signal outputted based on at least the transfer signal and may shape the timing signal by limiting the pulse width to the predetermined pulse width.

In the driving method of an electro-optical device according to the fourth aspect of the invention, in causing the data line to shape, the data line circuit may be supplied with plural series of first enable signals having a first pulse width narrower than that of the timing signal outputted based on at least the transfer signal and one series of second enable signals having a second pulse width narrower than the first pulse width, and may shape respective pulses of the timing signal on the basis of the plural series of first enable signals so as to limit the pulse width of the timing signal to the first pulse width and may shape all pulses of the timing signal on the basis of the one series of the second enable signals after being limited to the first pulse width so as to limit the pulse width of the timing signal to the second pulse width.

In the driving method of an electro-optical device according to the fourth aspect of the invention, in causing the precharge circuit to output the input signal as the timing signal, the transfer signal may be directly inputted to the precharge circuit from the shift register.

In accordance with the fourth aspect of the invention, the driving method of an electro-optical device can be applied to the driving circuit for an electro-optical device according to the first aspect of the invention (including various configuration described above). Therefore, the same advantages as those of the driving circuit for an electro-optical device according to the first aspect of the invention can be obtained.

The effects and advantages of the invention will be apparent from embodiments described below.

BRIEF DESCRIPTION OF THE DRAWINGS

The invention will be described with reference to the accompanying drawings, where like numbers reference like elements, and where.

DESCRIPTION OF THE EMBODIMENTS

Hereafter, embodiments of the invention will be described with reference to the drawings. Moreover, in the embodiments described below, an electro-optical device of the invention is applied to a liquid crystal device.

First Embodiment

An electro-optical device according to a first embodiment of the invention will be described with reference to FIGS. 1 to 5B.

Figure 1:
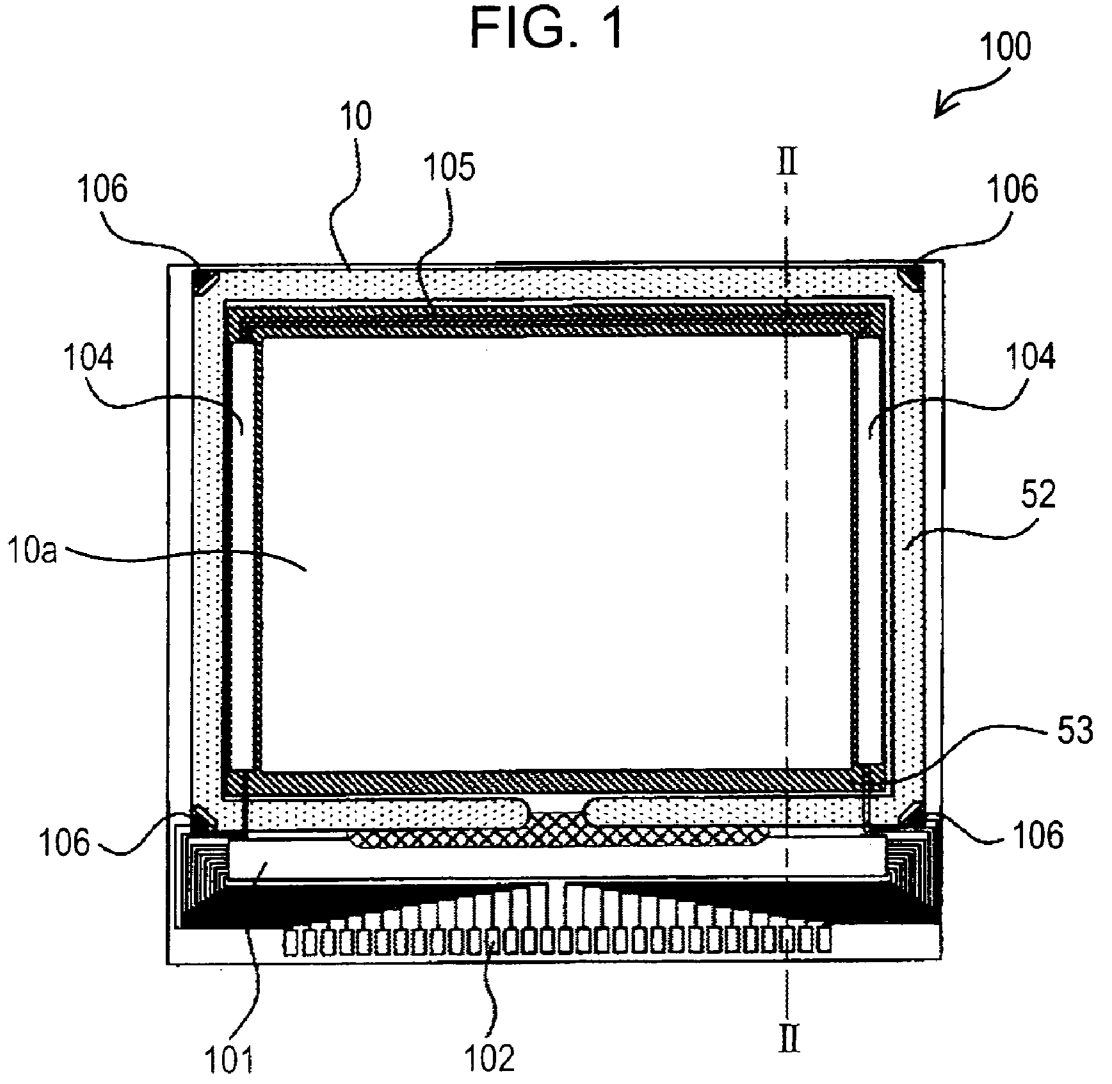
FIG. 1 is a plan view showing a configuration of a liquid crystal device according to a first embodiment of an electro-optical device of the invention.
Figure 2:
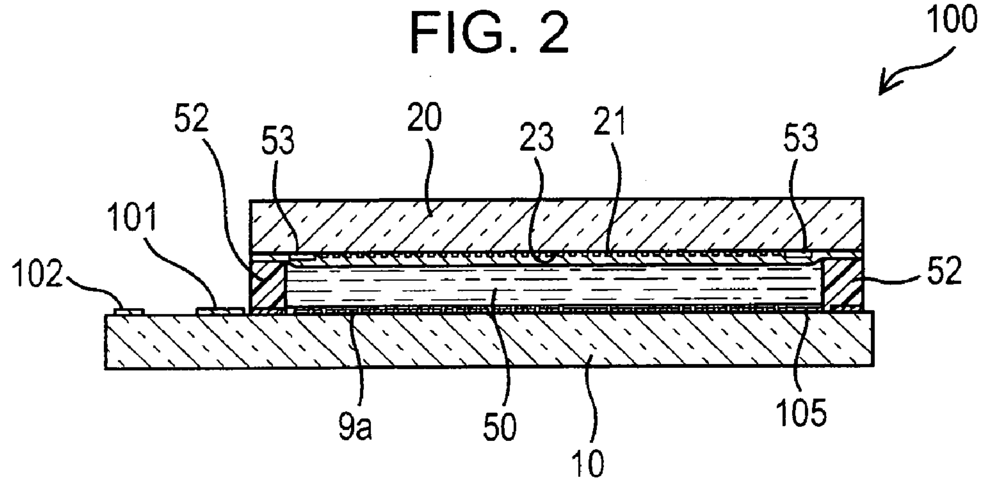
FIG. 2 is a cross-sectional view taken along the line II-II of FIG. 1.
Figure 3:
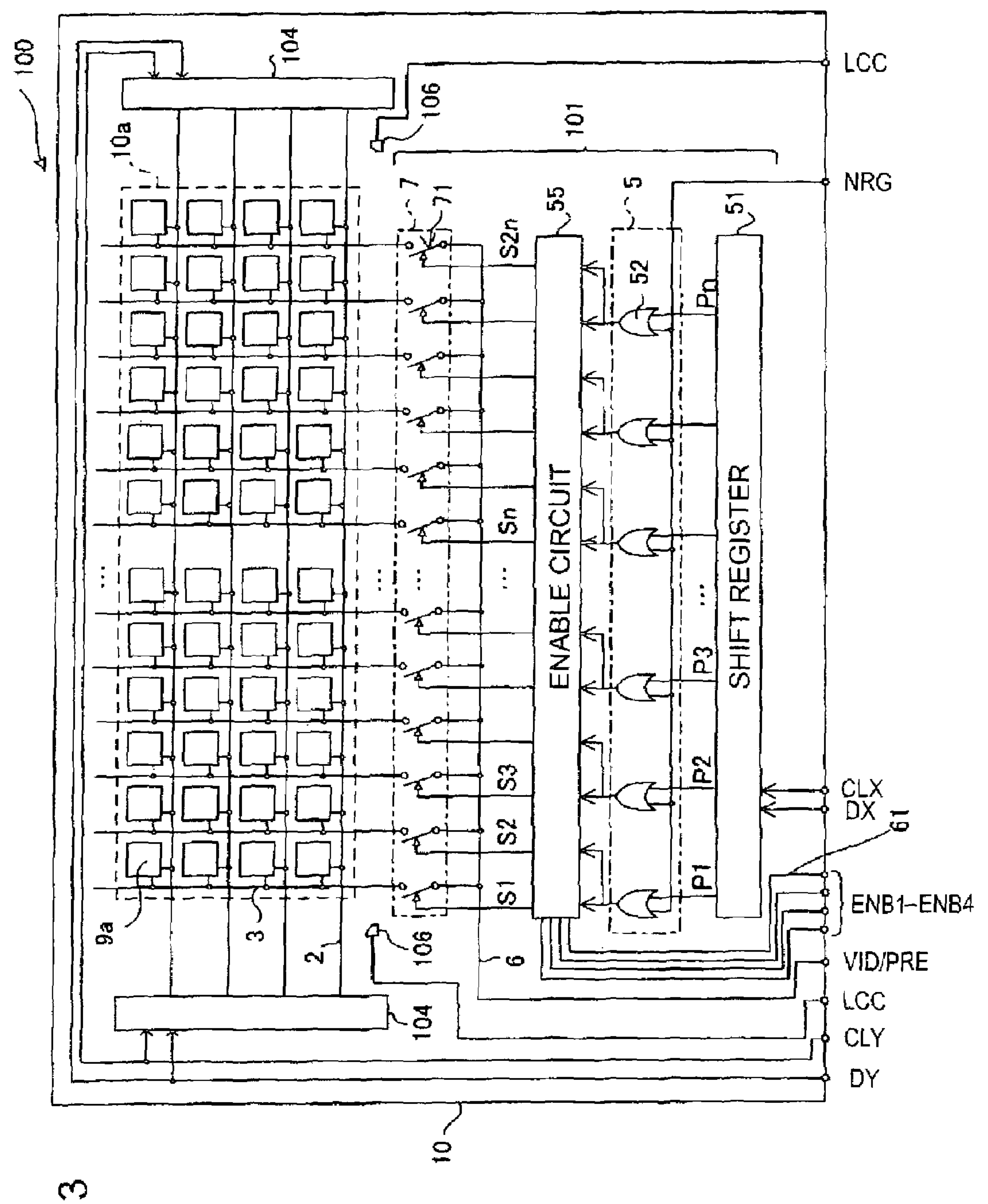
FIG. 3 is a block diagram showing a configuration of the liquid crystal device according to the first embodiment of the invention.
Figure 4:
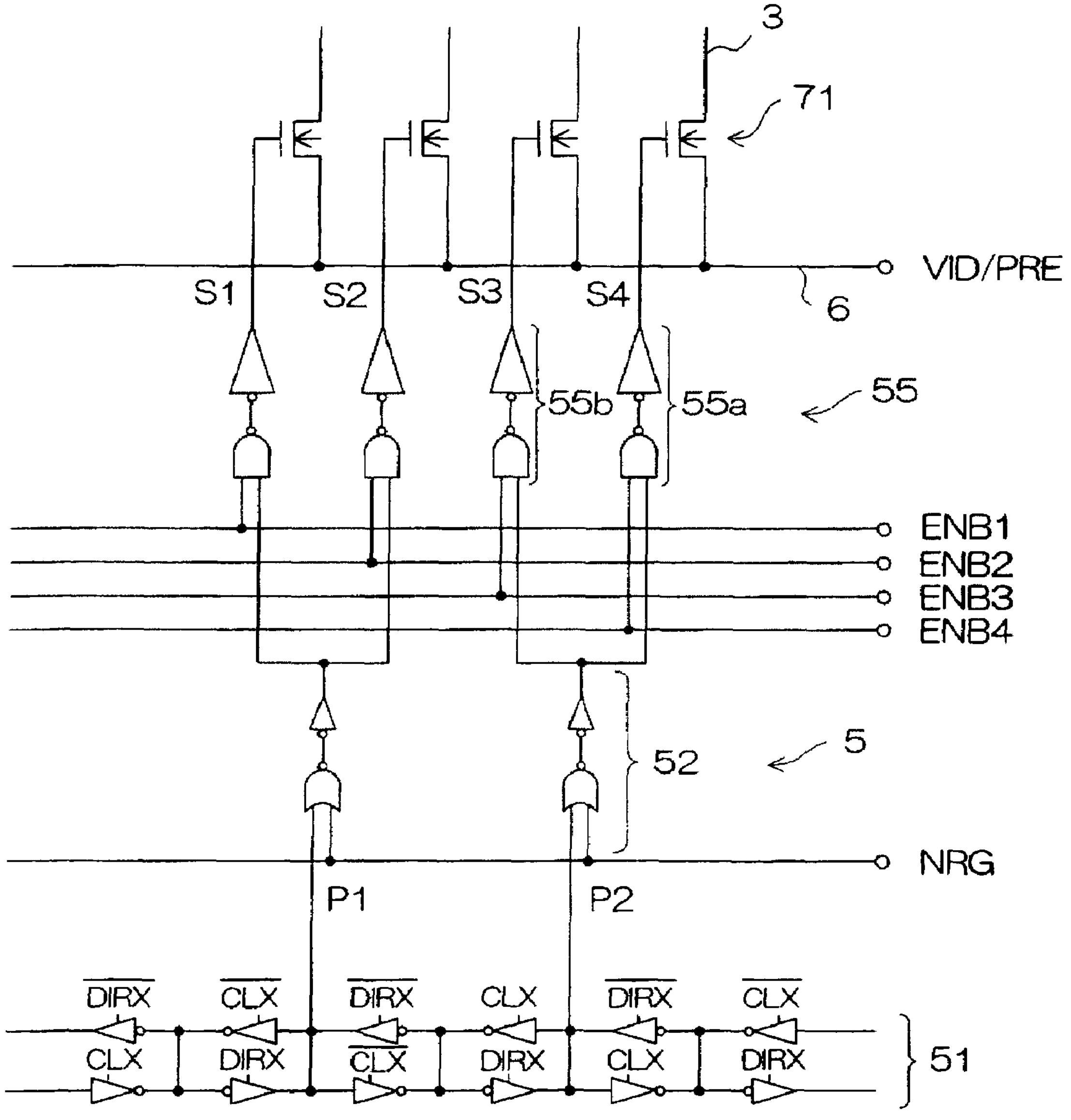
FIG. 4 is a circuit diagram showing a configuration of a data line driving circuit in the liquid crystal device according to the first embodiment of the invention.

First, the configuration of the liquid crystal device according to the present embodiment will be described with reference to FIGS. 1 to 5. FIG. 1 is a plan view of a liquid crystal device as viewed from a counter substrate side. FIG. 2 is a cross-sectional view taken along the line II-II of FIG. 1. FIG. 3 shows the configuration of a driving circuit of the liquid crystal device. FIG. 4 shows the specified configuration of the data line driving circuit of FIG. 3. The liquid crystal device according to the present embodiment includes a display panel 100 having an internal driving circuit and a circuit unit that performs overall drive control or various processes on image signals.

Referring to FIGS. 1 and 2, in the display panel 100, a TFT array substrate 10 and a counter substrate 20 are arranged to face each other. A liquid crystal layer 50 is sealed between the TFT array substrate 10 and the counter substrate 20, which are bonded to each other by a sealant 52 provided at a sealing region in the periphery of an image display region 10A. The sealant 52 is made of a material, such as ultraviolet curable resin, thermosetting resin, or the like, for bonding both substrates and is coated on the TFT array substrate 10 during the manufacturing process and then is cured by ultraviolet ray irradiation, heating, or the like. Further, gap materials, such as glass fibers or glass beads, are distributed into the sealant 52 in order to maintain the gap between the TFT array substrate 10 and the counter substrate 20 to a predetermined value. A frame light-shielding film 53, which defines a frame region of the image display region 10A, is provided on the counter substrate 20 inside the sealing region where the sealant 52 is disposed. A part or all of the frame light-shielding film 53 can be provided as an internal light-shielding film on the TFT array substrate 10.

A data line driving circuit 101 and external circuit connection terminals 102 are provided along a side of the TFT array substrate 10 in the periphery of the image display region 10A on the TFT array substrate 10. Scanning line driving circuits 104 are provided to cover the frame light-shielding film 53 along two sides adjacent to the side. Further, in order to connect two scanning line driving circuits 104 provided on both sides of the image display region 10A, a plurality of wiring lines 105 are provided along the remaining one side of the TFT array substrate 10 so as to cover the frame light-shielding film 53. Further, vertical conduction terminals 106 are disposed between the TFT array substrate 10 and the counter substrate 20 to ensure an electrical conduction between both substrates.

In FIG. 2, on the TFT array substrate 10, pixel electrodes 9A are formed on pixel switching TFTs or various wiring lines, and an alignment film is formed thereon. On the other hand, a counter electrode 21 is formed in the image display region 10A on the counter substrate 20 to face the pixel electrodes 9A with the liquid crystal layer 50 interposed therebetween. That is, when a voltage is applied to the pixel electrodes 9A and the counter electrode 21, a liquid crystal storage capacitance is formed between the pixel electrode 9A and the counter electrode 21. A light-shielding film 23 of a lattice shape or a stripe shape is formed on the counter electrode 21 and is covered with an alignment film. The liquid crystal layer 50 is made of liquid crystal, for example, in which one kind or several kinds of nematic liquid crystal is mixed and has a predetermined alignment state between the pair of alignment films.

Further, though not shown, a sampling circuit 7 described below and the like are formed on the TFT array substrate 10, in addition to the data line driving circuit 101 and the scanning line driving circuits 104. In addition, a test circuit that tests quality, defects, or the like of the liquid crystal device during manufacture or at the time of shipping may be provided. Further, on the counter substrate 20 on which projected light is incident and on the TFT array substrate 10 from which emitting light is emitted, a polarizing film, a retardation film, a polarizing plate, or the like are disposed in a predetermined direction according to, for example, an operation mode, such as a twisted nematic (TN) mode, a super twisted nematic (STN) mode, and a double super twisted nematic mode (D-STN) mode, or a normally white mode and a normally black mode.

In FIG. 3, the TFT array substrate 10 is made of, for example, a quartz substrate, a glass substrate, a silicon substrate, or the like, and the pixel electrodes 9A are divided and arranged in the image display region 10A thereon. Each pixel electrode 9A is disposed corresponding to a pixel unit. The display panel 100 is driven to control the voltage applied to the pixel electrode 9A and to modulate the electric field applied to the liquid crystal layer 50 (not shown) for each pixel unit. Accordingly, the amount of transmitted light between both substrates is changed to display an image with a gray-scale level. The display panel 100 uses a TFT active matrix driving method. In the image display region 10A of the TFT array substrate 10, the pixel electrodes 9A that are arranged in a matrix shape and scanning lines 2 and data lines 3 that are arranged to cross each other are formed, and the pixel units corresponding to pixels are formed. Further, though not shown, a TFT that is turned on or off according to a scanning signal supplied via the scanning line 2, or storage capacitance for holding the voltage applied to the pixel electrode 9A, is formed between the pixel electrodes 9A and the data lines 3. Further, a driving circuit, such as the data line driving circuit 101 or the like, is formed in the periphery of the image display region 10A.

Here, the data line driving circuit 101 is a so-called 'video precharge'-type driving circuit. The data line driving circuit 101 is constituted to drive the sampling circuit 7 by a timing signal described below, and the sampling circuit 7 samples a precharge signal PRE or an image signal VID supplied to an image signal line 6 to apply that to the data line 3.

The data line driving circuit 101 includes a shift register 51, a precharge circuit 5, an enable circuit 55, and a sampling circuit 7. The shift register 51 is constituted to sequentially output the transfer signal Pi (where i=1, 2, . . . , n) from each stage on the basis of a shift register start signal DX and an X-side clock signal CLX (or an inverted signal CLX') of a predetermined period which are inputted to the data line driving circuit 101.

The precharge circuit 5 has n precharge switches 52 provided in correspondence to the transfer signal Pi (where i=1, 2, . . . , n) outputted from the shift register 51. The precharge switch 52 is a switch for introducing a precharge timing signal NRG (noise reduction gate) into the data line driving circuit 101 and typically has an OR circuit to receive the transfer signal Pi (where i=1, 2, . . . , n) and the precharge timing signal NRG and to output them to the enable circuit 55. Here, the transfer signal Pi (where i=1, 2, . . . , n) is a timing signal for defining a data writing period of the image signal VID, and the precharge timing signal NRG is a timing signal for defining a precharge period ahead of the data writing period. Therefore, in the following description, when one or both are indicated with no identification, it is simply called 'timing signal'.

The enable circuit 55, for example, which has an AND circuit, is supplied with enable signals ENB1 to ENB4 from four enable supply lines 61, together with the timing signal. The enable circuit 55 forms the pulse waveform of the timing signal on the basis of four enable signals ENB1 to ENB4 and has a function of outputting a sampling circuit driving signal Si (where i=1, . . . , 2n). The pulse width of the enable signal is at least narrower than the pulse width of the transfer signal.

The sampling circuit 7 has 2n sampling switches 71 provided in correspondence to the data lines 3. The sampling switch 71, as shown in FIG. 4, has a P-channel or N-channel single-channel-type TFT and is constituted such that the image signal line 6 and the data line 3 are connected between a source and a drain thereof and the sampling circuit driving signal Si (where i=1, . . . , 2n) is inputted to a gate thereof. Further, the sampling switch 71 can be of a complementary type.

In FIG. 4, the enable signal 55 has a pair of logic circuits, that is, logic circuits 55A and 55B divided into two series by a common branch wiring line as a unit, and has a plurality of pairs. The logic circuits 55A and 55B are examples of unit circuits of the invention and are constituted to receive one timing signal and to output one sampling circuit driving signal Si (where i=1, . . . , 2n). Specifically, the logic circuits 55A and 55B are constituted such that the same timing signal is supplied from the branch wiring line and different signals among the four enable signals ENB1 to ENB4 are supplied, thereby obtaining a logical AND of the timing signal and the enable signal and outputting the logical AND as the sampling circuit driving signal Si (where i=1, . . . , 2n).

For this reason, the timing signal outputted from the precharge switch 52 is divided into two by the branch wiring line and simultaneously inputted to both logic circuits 55A and 55B in a pair. In such a manner, with the wiring line of which the output end is branched, the space of the wiring line layout is saved and a narrow pitch is obtained since the number of wiring lines at the input terminal is reduced by half. In particular, in the present embodiment, the number of precharge switches 52 is half.

Further, here, the shift register 51, the precharge switch 52, and the enable circuit 55 are sequentially arranged along one side of the image display region 10A. The next stage of the enable circuit 55 is of relatively high density since the logic circuit or the sampling switch 71 described below is arranged, or an enable supply line or the image signal line is formed. On the other hand, a region adjacent to the shift register 51 is of relatively low density since there are almost no wiring lines or elements, excluding the transfer signal output wiring line. For this reason, the precharge switch 52 and the supply line of the sampling timing signal NRG are provided in this region, and thus the circuit layout can be relatively easily designed, and the circuit space negligibly expands.

In order to efficiently obtain the effect of the circuit layout or the reduction of the number of elements described above, preferably, the circuits are made in multi-series from the shift register 51 and the precharge switch 52 provided in front of the circuit is plurally divided. That is, the precharge switch 52, as shown in FIGS. 3 and 4, is desirable disposed close to the shift register 51 and is provided to directly receive the transfer signal Pi (where i=1, . . . , n).

Moreover, here, for simplicity of explanation, the image signal line 6 is shown individually, and any sampling switch 71 is made to supply the image signal VID from the image signal line 6, but the image signal can be serial-parallel expanded, that is, phase expanded. For example, if the image signal is serial-parallel expanded to six image signals VID1 to VID6. The image signal is inputted to the sampling circuit 7 through each of the six image signal lines. The serial image signals are converted into a parallel image signal and, if the parallel image signal is simultaneously supplied to the plurality of image signal lines, the input of the image signal from the data line 3 can be performed for each group, and thus a driving frequency can be suppressed.

In order to scan the pixel electrodes 9A arranged in a matrix shape in an arrangement direction of the scanning lines 2, the scanning line driving circuit 104 is constituted to linear-sequentially apply a scanning signal generated on the basis of a Y-side clock signal CLY (and an inverted signal CLY'), which is a reference clock of the scanning signal application, and a shift register start signal DY to the plurality of the scanning lines 2. At this time, the voltage is simultaneously applied from two scanning line driving circuit 104 to both ends of each scanning line 2.

Further, various timing signals, such as the clock signal and the like, are generated by a timing generator (not shown) to be supplied to each circuit of the TFT array substrate 10. Further, a power supply voltage or the like required for driving each driving circuit is also supplied from the external circuit. Further, a counter electrode potential LCC from the external circuit is supplied to a signal line, which is led from the vertical conduction terminal 106. The counter electrode potential LCC is supplied to the counter electrode 21 through the vertical conduction terminal 106. The counter electrode potential LCC becomes a reference potential of the counter electrode 21 for forming the liquid crystal storage capacitance by properly holding the potential difference with the pixel electrode 9A.

Figure 5A:
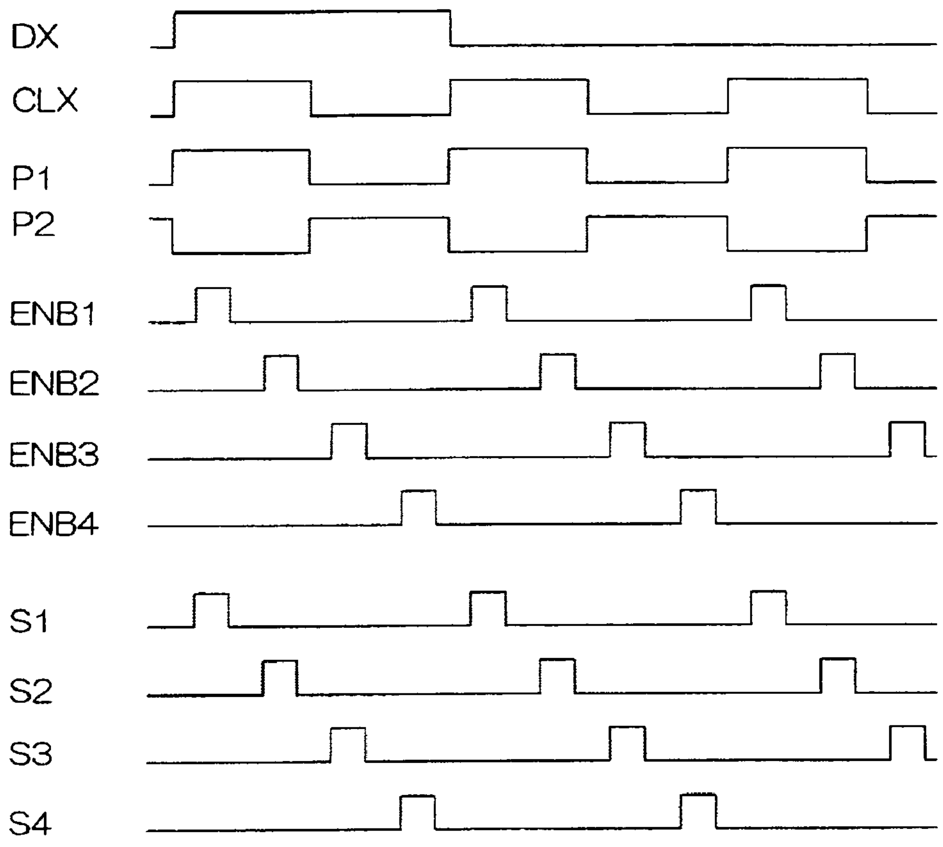
FIG. 5A is a timing chart of the driving circuit shown in FIG. 4.
Figure 5B:
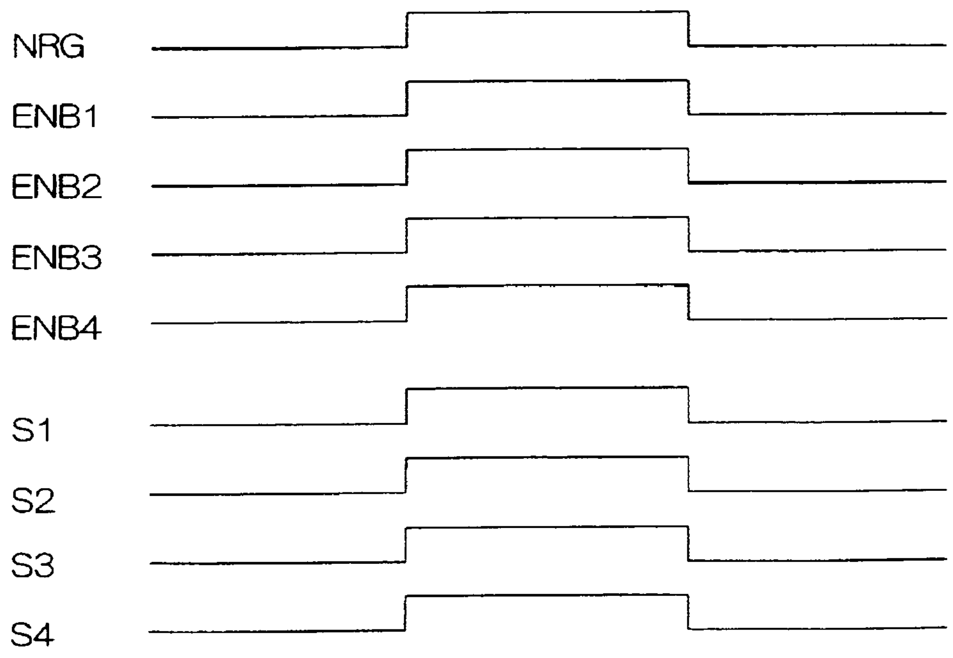
FIG. 5B is a timing chart of the driving circuit shown in FIG. 4.

Next, the operation of the liquid crystal device will be described with reference to FIGS. 3 to 5B. Here, FIGS. 5A and 5B are timing charts of various signals of the data line driving circuit. Specifically, FIGS. 5A and 5B show driving methods of the data writing period and the precharge period, respectively.

As shown in the timing chart of FIG. 5A, in the data writing period, the transfer signal Pi (where i=1, . . . , n) is sequentially outputted from the shift register 51 on the basis of the X-side clock signal CLX (and the inverted signal CLX') and the shift register start signal DX. At that time, odd-numbered transfer signals P2*k*−1 and even-numbered transfer signals P2*k* (where k=1, . . . , n/2) are outputted with complementary timings. The transfer signal Pi (where i=1, . . . , n) is inputted to the enable circuit 55 through the precharge switch 52. At this time, each transfer signal Pi (where i=1, . . . , n) is divided into two by the branch wiring line, which are inputted to the logic circuits 55A and 55B, respectively. The logic circuits 55A and 55B perform trimming on the transfer signal Pi on the basis of the different enable signals by determining the logical AND.

Specifically, as shown in FIG. 4, in each of the logic circuits 55A and 55B to which the transfer signal P1 is inputted, the pulse width of the transfer signal Pi is limited on the basis of the pulse width of the enable signals ENB1 and ENB2 to be outputted as the sampling circuit driving signals S1 and S2. Similarly, the transfer signal P2 has its pulse width limited on the basis of the pulse width of the enable signals ENB3 and ENB4 to be outputted as the sampling circuit driving signals S3 and S4.

In such a manner, the sampling circuit driving signals S1, S2, S3, . . . are generated, in which the waveforms of the enable signals ENB1 to ENB4 are reflected, and are sequentially supplied to the sampling circuit 71. The enable signals ENB1 to ENB4 have the different phases to be deviated from one another such that the pluses do not overlap one another. Therefore, in the logic circuits 55A and 55B from which the same transfer signal Pi (where i=1, . . . , n) is divided to be inputted, the pulse waveforms of different timings are outputted on the basis of the inputted enable signal. The transfer signal Pi (where i=1, . . . , n) is outputted in accordance with the clock signal CLX inputted to the shift register 51. Accordingly, high frequency is limited because of the restriction by the clock cycle. If a logical AND with the enable signal is determined in the enable circuit 55 to limit the pulse width, narrowness can be achieved.

The sampling circuit driving signal Si (where i=1, . . . , 2n) outputted from the enable circuit 55 drives each of the sampling switches 71 and supplies the image signal VID from the image signal line to the data line 3 connected to the sampling switch 71. The image signal VID is applied to the pixel electrode 9A of a selected pixel row from each data line 3 and data writing is performed.

On the other hand, as shown in the timing chart of FIG. 5B, in the precharge period ahead of the data writing period, the precharge timing signal NRG, instead of the transfer signal Pi (where i=1, . . . , n), is inputted to the precharge switch 52. Further, the timing signal based on the precharge timing signal NRG is inputted to the gates to drive all the sampling switches 71. Further, here, the enable signals ENB1 to ENB4 are inputted to have the same pulse width as that of the precharge timing signal NRG. Accordingly, the enable circuit 55 does not practically perform a function of forming the pulse waveform, as described above. For this reason, the sampling circuit driving signal Si (where i=1, . . . , n/2) outputted in this period becomes almost the same waveform as that of the precharge timing signal NRG. That is, in the application period of the precharge timing signal NRG, the precharge signal PRE is supplied to the data line 3 and precharging is performed. Here, all the data lines 3 are electrically connected to the image signal lines 6, and thus precharging is performed collectively for all the data lines 3.

<Modification>

Next, in reference to FIG. 6, a modification of the data line driving circuit 101 shown in FIGS. 3 and 4 will be described. Further, hereinafter, the same parts as those in FIGS. 1 to 5B are represented by the same reference numerals. For simplicity of explanation, the detailed description of the parts for performing the same functions and signal processes will be omitted.

Figure 6:
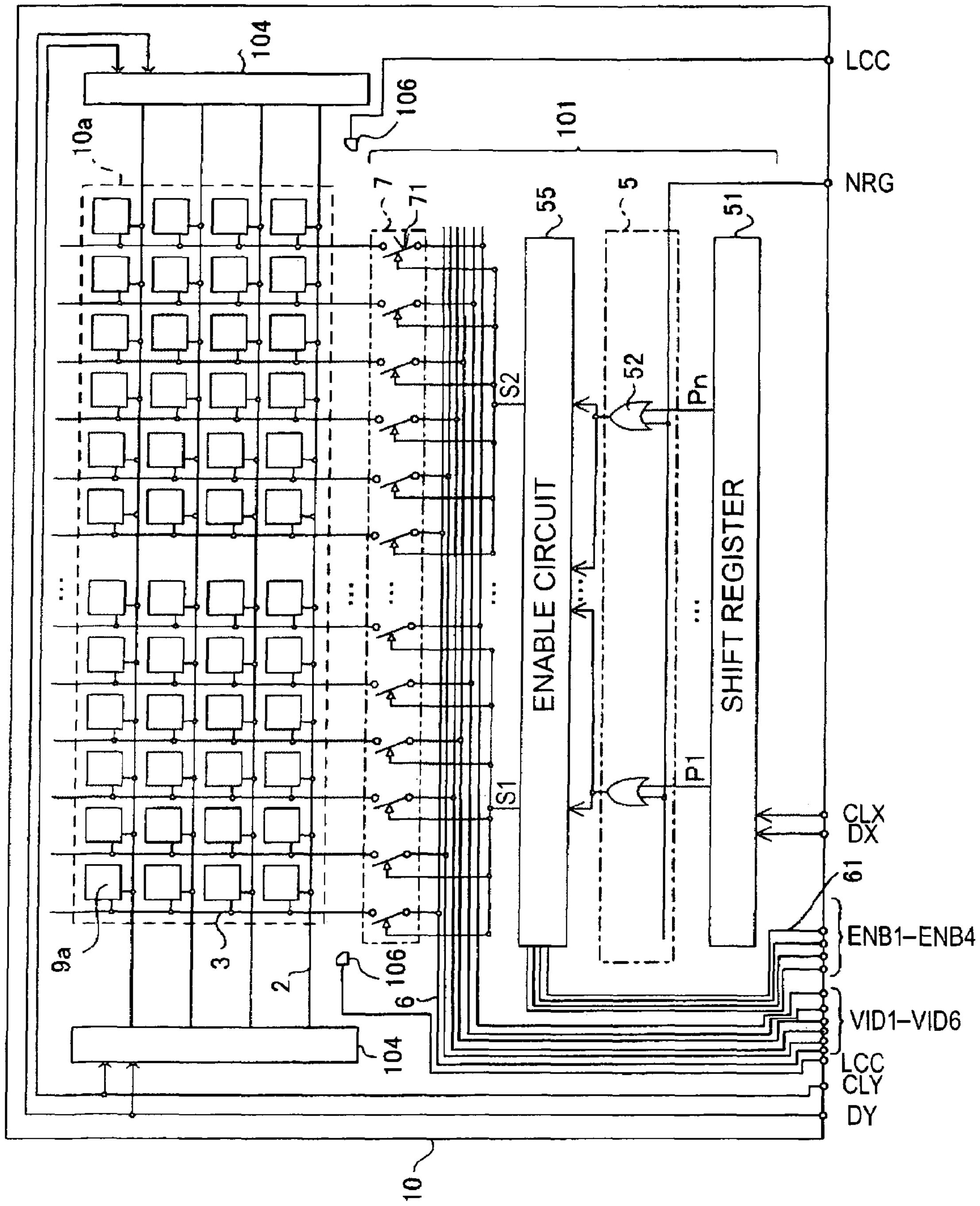
FIG. 6 is a circuit diagram showing a configuration of a data line driving circuit in a liquid crystal device according to a modification of the first embodiment of the invention.

In the modification of FIG. 6, the serial-parallel expansion or the serial-parallel conversion, that is, phase expansion, is performed on the image signal by the external circuit (not shown), and is supplied as six parallel image signals VID1 to VID6 to the electro-optical device. The image signals VID1 to VID6 are inputted to the sampling circuit 7 through the six image signal lines 6 on the TFT array substrate 10. On the other hand, the transfer signal Pi is generated in the enable circuit 55 and then is divided into six to be supplied to the sampling circuit 7. Accordingly, the six data lines are simultaneously driven by the transfer signal Pi. If the parallel image signals VID1 to VID6 obtained by converting the serial image signal are collectively supplied, the input of the image signal to the data line 3 can be performed for each group, and thus the driving frequency can be suppressed in the data line driving circuit 101.

According to the modification, while obtaining the benefit by the serial-parallel expansion, it is possible to efficiently obtain the advantages of the circuit layout or reduction in the number of elements, like the data line driving circuit 101 shown in FIGS. 3 and 4. Besides, the precharge switch 52 is disposed in front of the enable circuit 55, and thus the generation of writing spots between the groups of the data lines 3 which are driven at the same time, that is, the group spots which are relatively easily seen at the time of the serial-parallel expansion, can be markedly improved, as compared with the comparative example which is described below.

COMPARATIVE EXAMPLE

Figure 7:
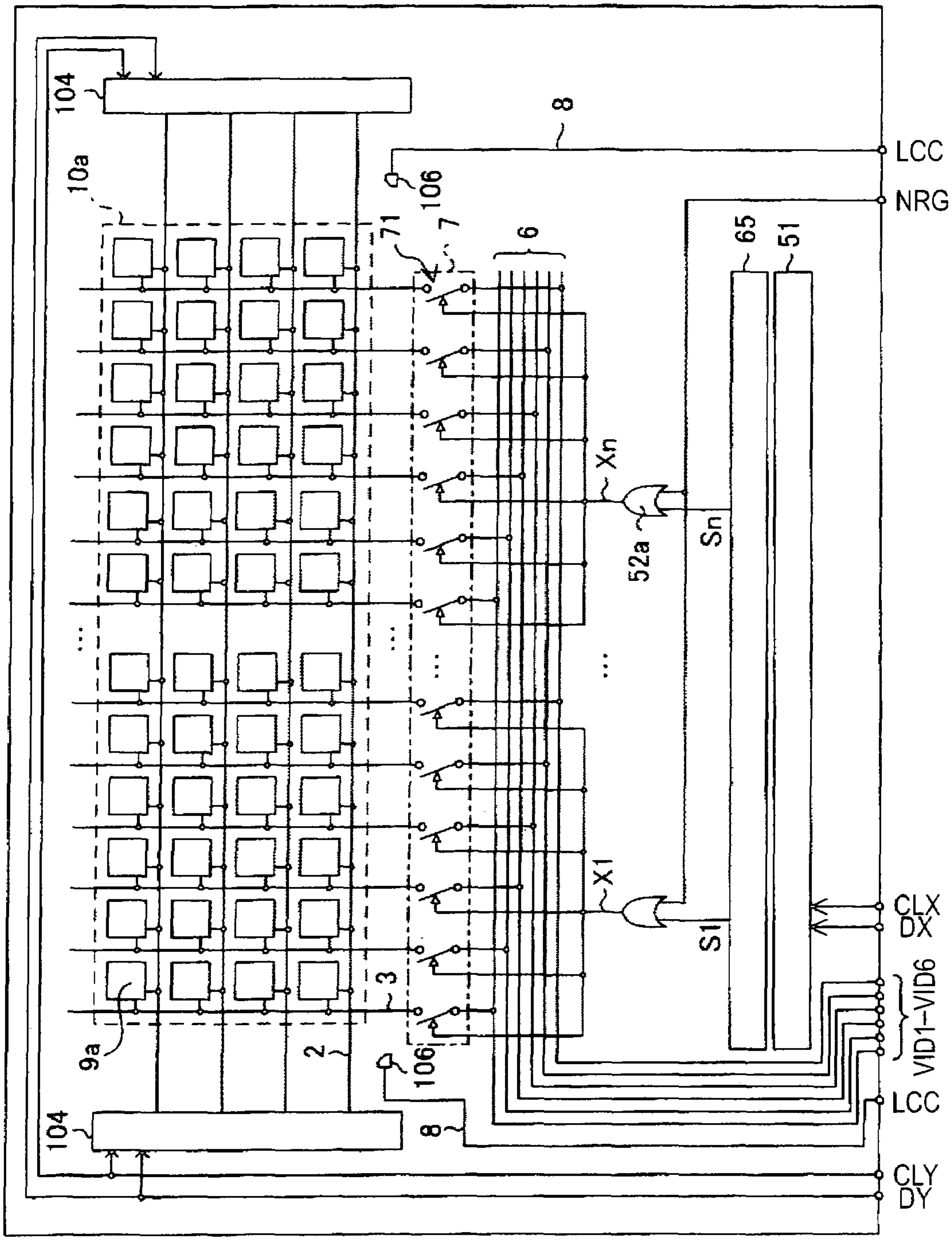
FIG. 7 is a circuit diagram showing a comparative example of the liquid crystal device according to the first embodiment of the invention.
Figure 8:
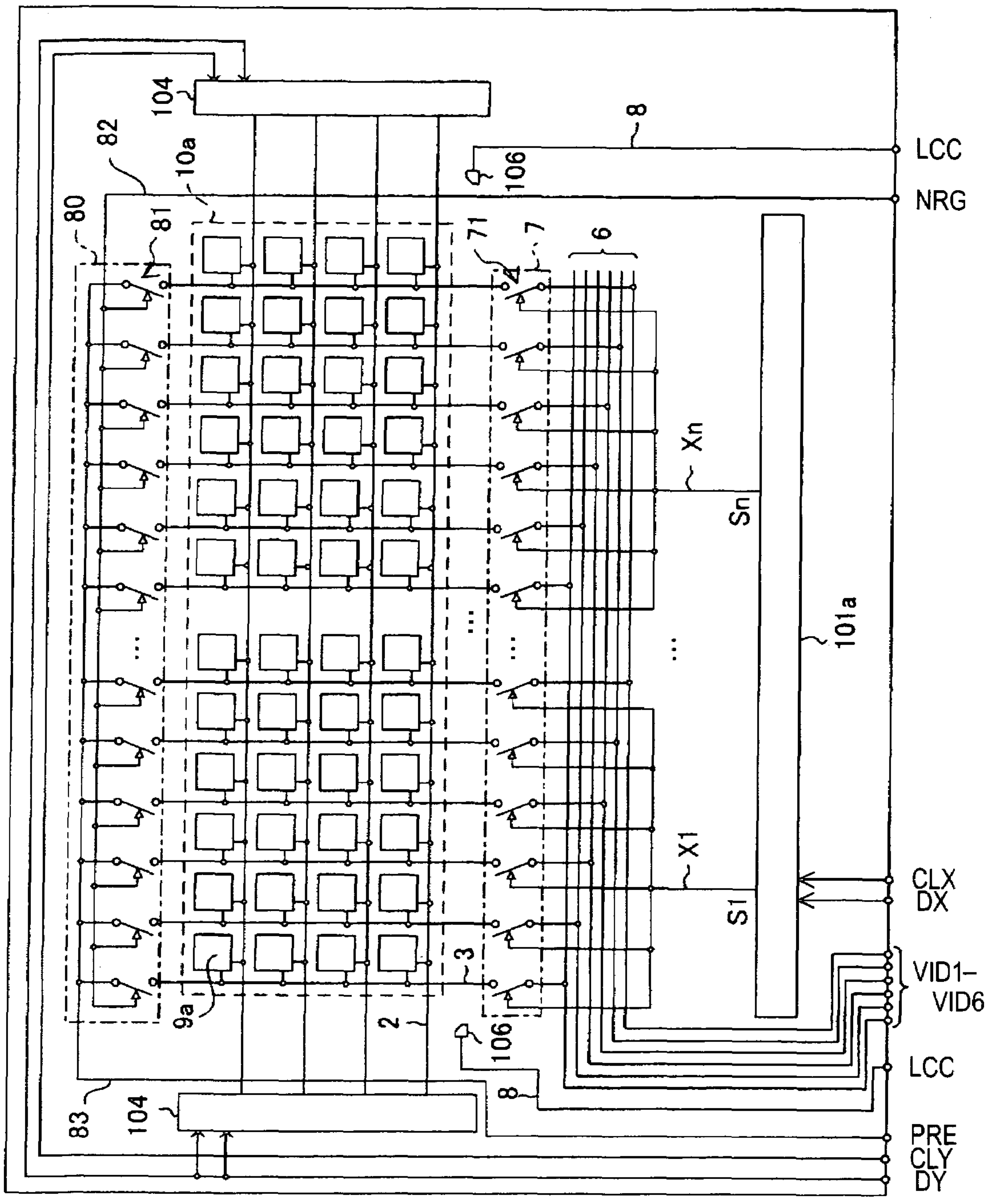
FIG. 8 is a circuit diagram showing a comparative example of the liquid crystal device according to the first embodiment of the invention.

Next, the comparative example of the first embodiment will be described with reference to FIGS. 7 and 8. FIGS. 7 and 8 show the configuration of essential parts of a liquid crystal device according to the comparative example.

The comparative example of FIG. 7 is of a video precharge type, like the embodiment, but the precharge switch 52A is inserted in the back of the enable circuit 65 and in front of the sampling circuit 7.

The sampling circuit driving signal Si (where i=1, . . . , n) generated by the enable circuit 65 and the shift register 51 is inputted to the six adjacent sampling switches 71 through the control signal line X1, . . . , Xn, each being divided into six. Accordingly, the sampling circuit 7 is driven for each group of six sampling switches 71. Further, in the comparative example, the control signal line X1, . . . , Xn is constituted such that the precharge timing signal NRG can be inputted thereto separately from the sampling circuit driving signal Si. More specifically, each signal line which supplies the sampling circuit driving signal Si and the precharge timing signal NRG is connected to the control signal line X1, . . . , Xn through the precharge switch 52A. The precharge timing signal NRG defines the precharge period ahead of the data writing period, that is, a sampling period, of the image signals VID1 to VID6, and is collectively supplied to the control signal line X1, . . . , Xn. Accordingly, all the sampling switches 71 by means of the precharge timing signal NRG are electrically conducted at the same time, such that all the data lines 3 are collectively connected to the pixel signal line 6 to be conduction states, thereby receiving the precharge signal PRE from the image signal line 6.

In this case, there is an advantage in that the precharge timing signal NRG is directly inputted to the sampling circuit 7, but the sampling circuit driving signal Si (where i=1, . . . , n) must pass through the precharge switch 52A before being inputted to the sampling circuit 7, and thus occasionally the waveform is delayed or distorted. For this reason, writing may not be performed satisfactorily, the contrast ratio may be deteriorated or writing spots may occur. On the contrary, in the above-described embodiment, the precharge switch 52 is disposed in front of the enable circuit 55, and thus such problems can be solved.

In the comparative example of FIG. 8, the precharge circuit 80 is separated from the data line driving circuit 101A to be connected to an opposite terminal of the data line 3. In the precharge switch 81 of the precharge circuit 80, the precharge timing signal NRG is supplied by the precharge wiring line 82 and the precharge signal PRE is supplied by the precharge signal line 83. The precharge wiring line 82 or the precharge signal line 83 is led from the display panel 100 and is indirectly or directly connected to the power source of the circuit unit. In the display panel having such a configuration, there is a problem of how to ensure present of sufficient space for forming the wiring lines relating to the precharge circuit 80 which include the precharge wiring line 82 and the precharge signal line 83. For this reason, the circuit layout cannot be made minute or the space cannot be saved. On the contrary, the embodiment uses the configuration of the video precharge type, and, in addition, disposes the precharge switch 52 just below the shift register 51. Further, the embodiment has the enable circuit 55 in the back in two series, and thus the number of the precharge switches 52 is reduced by half. Accordingly, the driving circuit is efficiently integrated enabling the circuit layout to be made minute.

Second Embodiment

Figure 9:
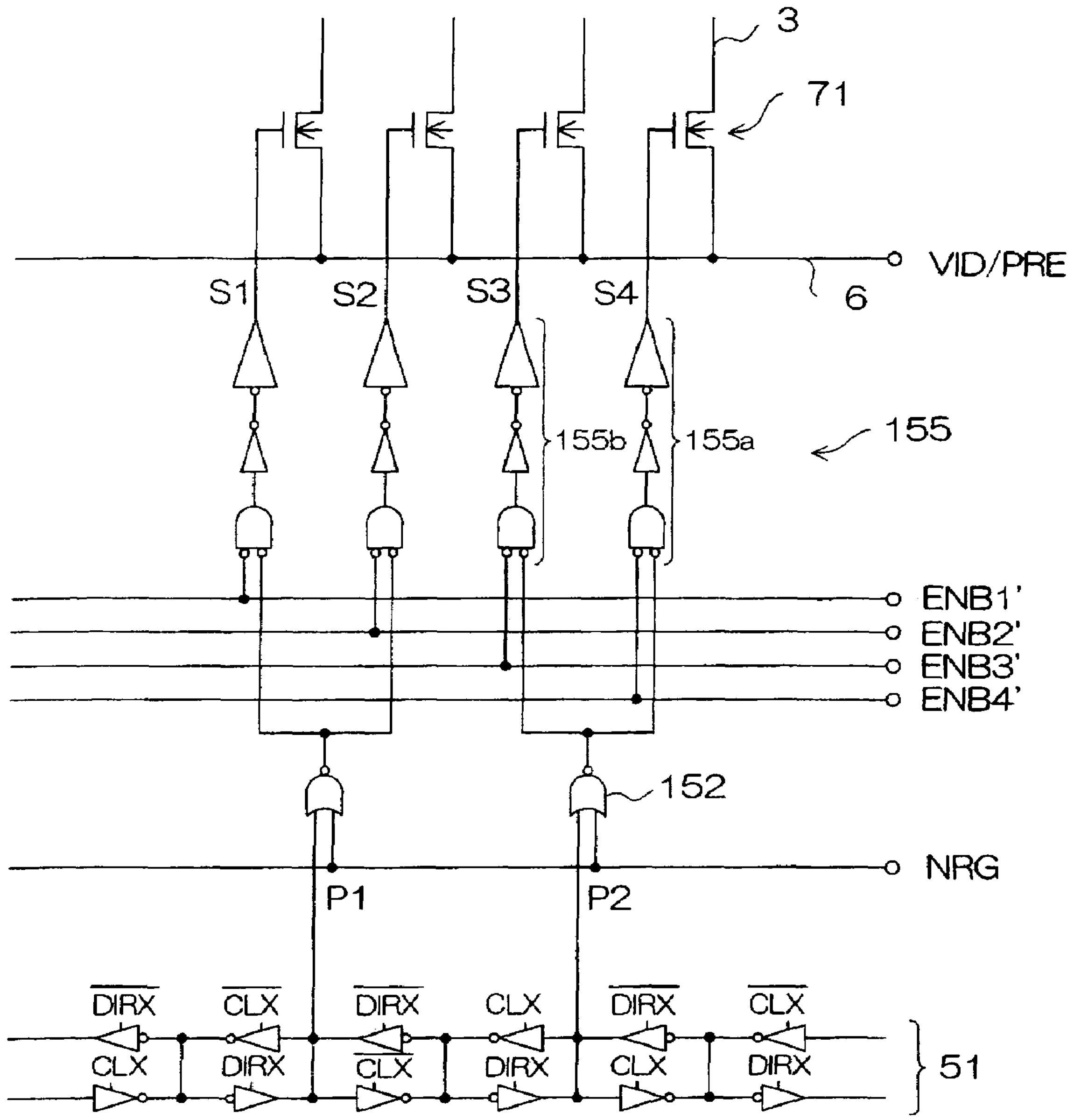
FIG. 9 is a circuit diagram showing a configuration of a data line driving circuit in a liquid crystal device according to a second embodiment of the invention.
Figure 10A:
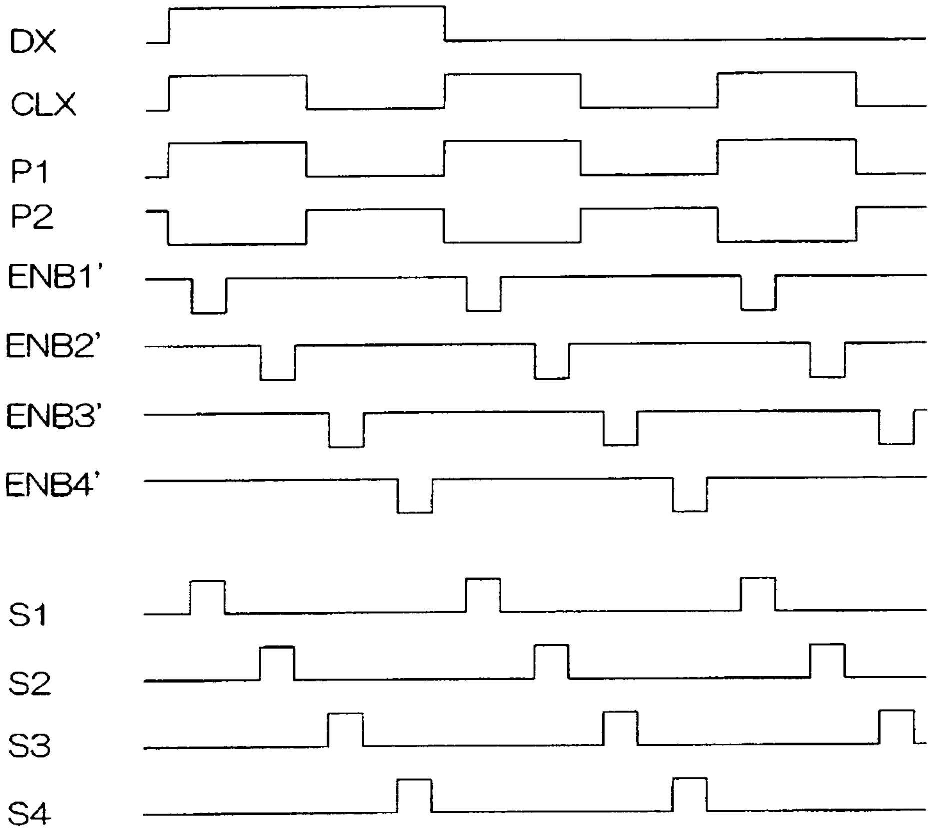
FIG. 10A is a timing chart of the driving circuit shown in FIG. 9.
Figure 10B:
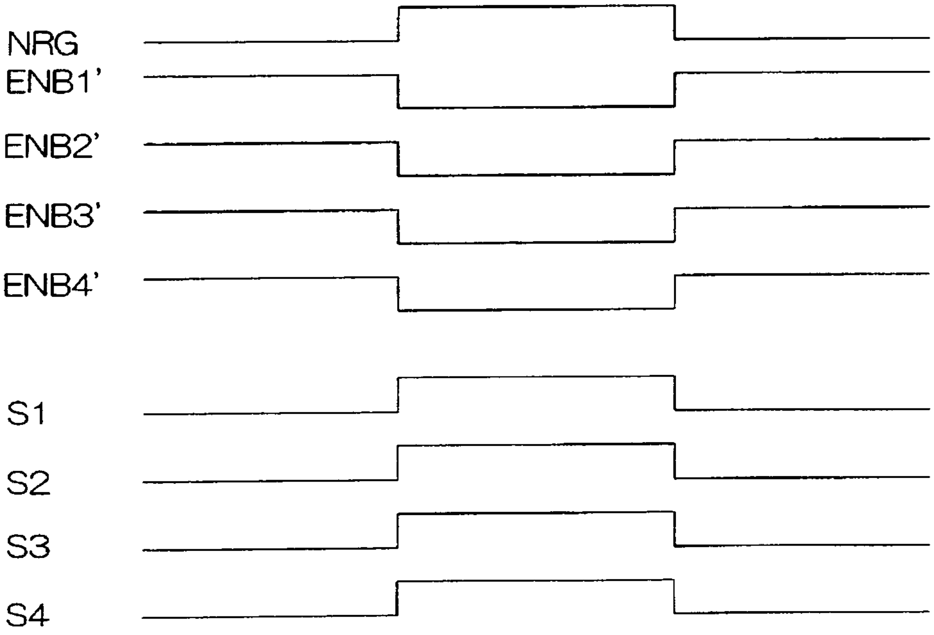
FIG. 10B is a timing chart of the driving circuit shown in FIG. 9.

Next, a second embodiment will be described with reference to FIGS. 9 and 10B. FIG. 9 shows the configuration of a data line driving circuit of a liquid crystal device according to the present embodiment. FIGS. 10A and 10B show the timing charts. FIGS. 10A and 10B correspond to a data writing period and a precharge period, respectively. Further, in the embodiments described below, the same parts as those in the first embodiment are represented by the same reference numerals and thus the descriptions thereof will be omitted.

In the first embodiment, the precharge switch 52 has an OR circuit, but the precharge switch 152 of the present embodiment has an NOR circuit. Accordingly, logical matching is achieved by the enable circuit 155, such that the timing signal outputted to the sampling switch 71 finally is outputted in a correct waveform. That is, logic circuits 155A and 155B in the enable circuit are constituted by AND circuits, but the timing signal inputted from the precharge switch 152 is inputted while being inverted. Accordingly, the enable signals ENB1' to ENB4' are also inputted while being inverted. That is, the logic circuits 155A and 155B operate as logical NOR circuits.

As shown in FIGS. 10A and 10B, it can be driven in the same manner as the first embodiment, except that the enable signals ENB1' to ENB4' are supplied as the inverted signals of the enable signals ENB1 to ENB4.

According to the present embodiment, the number of elements constituting the enable circuit 155 is increased, as compared with the first embodiment, but if the logic circuits 155A and 155B in the enable circuit 155 must be constituted by the AND circuits because of the transistor characteristics or the restriction of the layout, the simplest configuration can be achieved. Further, the precharge switch 152 can be constituted only by the NOR circuit, and thus it is advantageous to make the layout minute in the precharge switch 152. Further, the number of elements is reduced, and thus there is an advantage of preventing the delay of the timing signal, such that ease of control is achieved. Further, in the present embodiment, there is an advantage in that there is almost no change in the driving method even when the driving circuit is changed.

Third Embodiment

Figure 11:
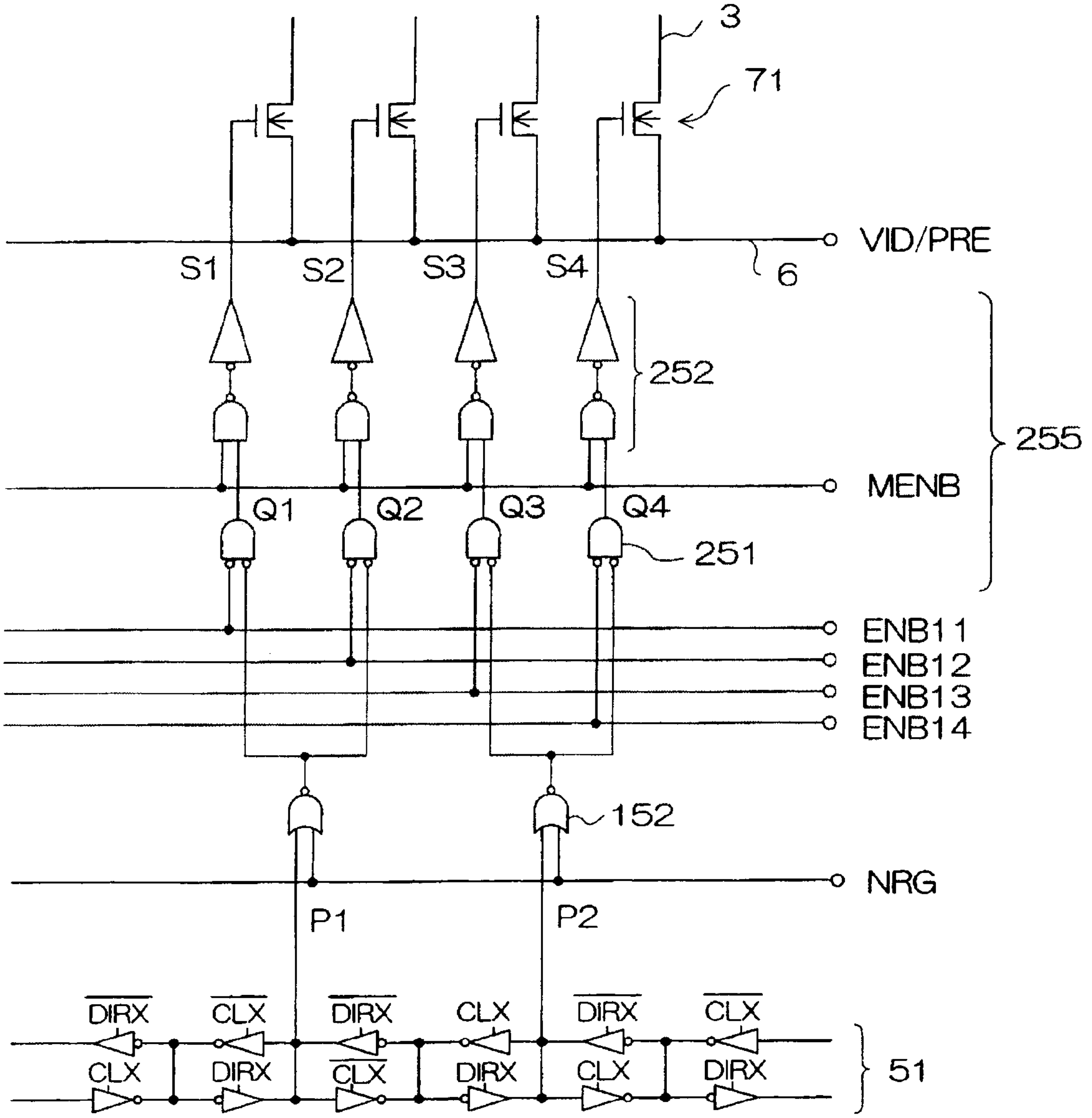
FIG. 11 is a circuit diagram showing a configuration of a data line driving circuit in a liquid crystal device according to a third embodiment of the invention.
Figure 12A:
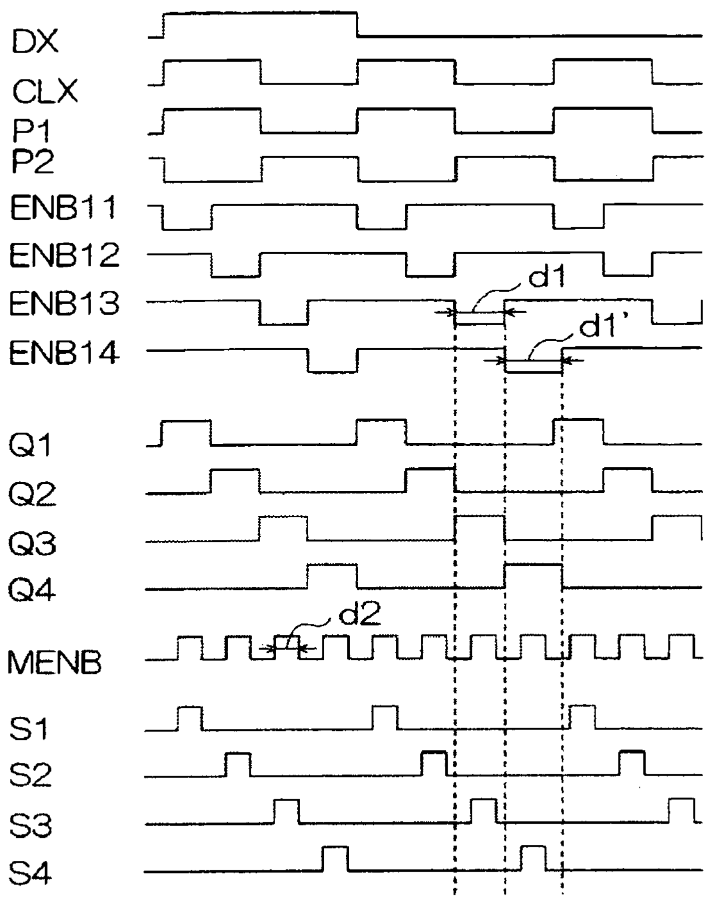
FIG. 12A is a timing chart of the driving circuit shown in FIG. 11.
Figure 12B:
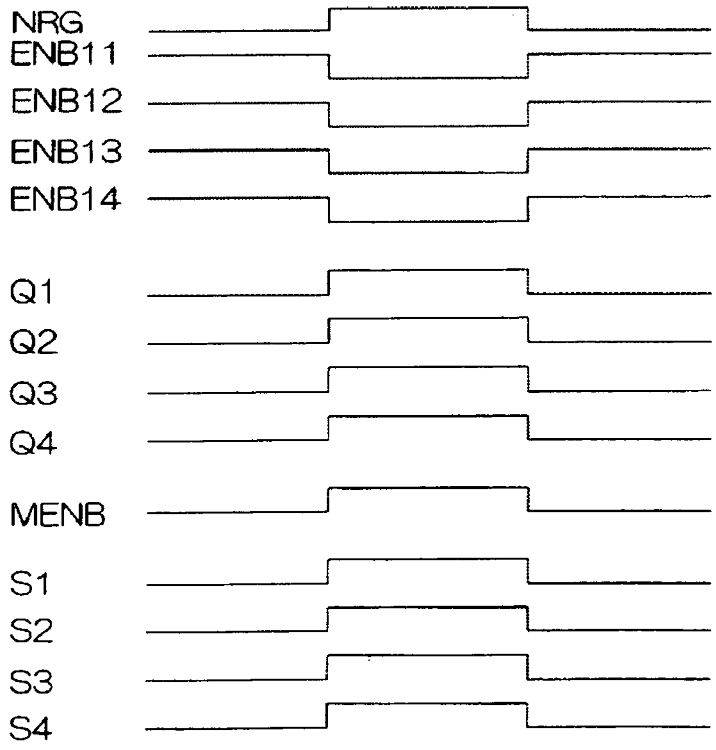
FIG. 12B is a timing chart of the driving circuit shown in FIG. 11.

Next, a third embodiment will be described with reference to FIGS. 11 and 12B. FIG. 11 shows the configuration of a data line driving circuit of a liquid crystal device according to the present embodiment. FIGS. 12A and 12B show the timing charts and correspond to a data writing period and a precharge period, respectively.

In the present embodiment, the enable circuit 255 has a two-stage configuration of logic circuits 251 and 252. The logic circuit 251 receives the timing signal from the precharge switch 152 and is supplied with any one of the enable signals ENB11 to ENB14 from four enable supply lines. The logic circuit 251 has a function to shape the timing signal (primarily the transfer signal Pi) on the basis of one of the four enable signals ENB11 to ENB14, and to output that timing signal as a first shaped signal Qi (where i=1, . . . , 2n). On the contrary, in general, the logical AND of two signals should be determined, but, here, since the precharge switch 152 is an NOR circuit, the logic circuit 251 is constituted to determine the logical AND of the inverted inputs of the respective signals.

The logic circuit 252 is provided at the next stage, and one master enable signal MENB is supplied thereto. The logic circuit 252 has a function to shape the first shaped signal Qi (where i=1, . . . , 2n) on the basis of the master enable signal MENB, and to output it as the sampling circuit driving signal Si (where i=1, . . . , 2n). The master enable signal MENB is separately generated from the enable signals ENB11 to ENB14, and the pulse width thereof is narrower than those of the enable signals ENB11 to ENB14.

Shaping of the signal waveform can be performed by substantially determining the logical AND with the enable signal. At that time, the timing signal of the transfer signal Pi (where i=1, . . . , n) or the waveform of the first shaped signal Qi (where i=1, . . . , 2n) is trimmed on the basis of the waveform of the master enable signal MENB or the enable signals ENB11 to ENB14 which have a narrow pulse width, and thus the pulse width thereof is limited to the pulse width of the enable signal. Here, the enable signal ENB11 to ENB14 and the master enable signal MENB are examples of the plural series of first enable signals and the one series of second enable signals of the invention.

Next, the operation of the liquid crystal device, especially, a process in which the transfer signal Pi (where i=1, . . . , n) is shaped as the sampling circuit driving signal Si (where i=1, . . . , 2n), will be described with reference to FIGS. 12A and 12B.

As shown in the timing chart of FIG. 12A, in the data writing period, first, the transfer signal Pi (where i=1, . . . , n) from the shift register 51 is outputted in an order of P1, P2, . . . . At that time, the odd-numbered transfer signal P2*k*−1 and the even-numbered transfer signal P2*k*(where k=1, . . . , n/2) are outputted with complementary timing.

Each of the transfer signals Pi (where i=1, . . . , n) is outputted while being inverted when passing through the precharge switch 52. Further, the transfer signal Pi is inputted while being inverted to the logic circuit 251, and determines the logical AND with any one of the enable signals ENB11 to ENB14 inputted while being inverted similarly. Accordingly, the pulse width is limited to the pulse width d1 of the enable signals ENB11 to ENB14 (that is, shaped by the enable signals ENB11 to ENB14).

Each output of the logic circuit 251 is the first shaped signal Qi (where i=1, . . . , 2n). As for each output, a case in which the waveforms do not completely match, since the series of enable signals ENB11 to ENB 14 are different. In this case, as compared with different pulses in the first shaped signals Qi (where i=1, . . . , 2n), the pulses with different widths are mixed. For example, as shown in FIGS. 12A and 12B, when the enable signal ENB14 has the pulse width d1' which is wider than the reference pulse width d1, the pulse width of the first shaped Q4 also becomes the pulse width d1'.

Here, the shaping process of the transfer signal Pi (where i=1, . . . , n) in the above-described logic circuit 251 is just the first shaping process, and subsequently, a second shaping process is performed by the logic circuit 252.

In the logic circuit 252, each of the first shaped signal Qi (where i=1, . . . , 2n) has the pulse width limited to the pulse width d2 of the master enable signal MENB by determining the logical AND with the master enable signal MENB, that is, is shaped by the master enable signal MENB. The master enable signal MENB is different from the enable signal ENB11 to ENB14 and is of a single series, and thus the pulse width d1 is always fixed. Further, the pulse width d2 is much narrower than the pulse width d1. For this reason, in the logic circuit 252, the pulse width d1' of the first shaped signal Q4 is also limited to the pulse width d2, and thus the sampling circuit driving signal S4 is properly generated to be outputted.

In such a manner, each pulse of the first shaped signal Qi (where i=1, . . . , 2n) is shaped on the basis of the waveform of the single master enable signal MENB, and thus the sampling circuit driving signal Si (where i=1, . . . , 2n) generated to be outputted has the pulse width equal to the pulse width d2, that is, in the logic circuit, it is possible to finally obtain the sampling circuit driving signal Si (where i=1, . . . , 2n) of which the pulse width is determined as the pulse width d2. Further, in the present embodiment, the signal outputted in each of the first shaping process and the second shaping process is controlled by the waveform of the enable signal in the pulse width and the pulse frequency or the gap between pulses. That is, the sampling circuit driving signal Si (where i=1, . . . , 2n) has the pulse frequency or the gap between pulses determined by the master enable signal MENB.

The sampling circuit driving signal Si (where i=1, . . . , 2n) drives the sampling switches 71 of the sampling circuit 7 and supplies the image signal VID from the image signal line 6 to the sampling switches 71. In such a manner, the image signal VID is sampled, but, since the pulse width of the sampling circuit driving signal Si (where i=1, . . . , 2n) conforms to the pulse width d2, the pulse width of the data signal generated from the image signal VID is also determined as the pulse width d2, such that they conform to each other. Further, the pulse frequency or the pulse gap of the sampling circuit driving signal Si (where i=1, . . . , 2n) has a predetermined value, and thus the pulse frequency or the pulse gap of the generated data signal is also determined as the predetermined value.

The data signal is applied to the pixel electrode 9A of the selected pixel row from each data line 3, a storage capacitance (not shown) is charged or discharged, and data writing is performed. At that time, since the pulse width is in accord, the data signal has luminance as a relatively appropriate value, and it is possible to reduce or prevent the generation of luminance spots on the basis of the difference of the pulse width in the display image.

On the other hand, as shown in the timing chart of FIG. 12B, in the precharge period ahead of the data writing period, it is basically driven in the same manner as the second embodiment. That is, during this period, both of the enable signal ENB11 to ENB14 and the master enable signal MENB are inputted in the same pulse width as the precharge timing signal NRG, the enable circuit 255 does not substantially perform a function of shaping the above-described pulse waveform. For this reason, the sampling circuit driving signal Si (where i=1, . . . , 2n) has almost the same waveform as that of the precharge timing signal NRG, and all the data lines 3 are precharged during the application period.

As such, according to the present embodiment, since the pulse width of the data signal is determined by the sampling circuit driving signal Si which is generated through the two steps of shaping processes, it is possible to solve without generating almost no or practically no luminance spots which are caused by the series difference of the enable signal ENB11 to ENB14, even when the plural series of the enable signals ENB11 to ENB14 are used in the first shaping process. Further, the pulse frequency or pulse gap of the data signal is determined as a predetermined value by the sampling circuit driving signal Si, and thus proper driving can be achieved.

Further, the pulse width of the sampling circuit driving signal Si (where i=1, . . . , 2n) is finally determined as the pulse width d2 of the master enable signal MENB, and thus the output waveform in the first shaping process may have bad shape precision. Accordingly, the pulse width of the transfer signal Pi (where i=1, . . . , n) is roughly controlled by the first shaping process, and then it is adjusted again with high precision by the second shaping process. For example, in the first shaping process, a shape error, excluding the change by the series difference of the enable signal ENB11 to ENB14, is allowed to remain in the transfer signal Pi (where i=1, . . . , n), and the error can be modified in accordance with precision of the master enable signal MENB in the second shaping process. Further, in the first shaping process, it is intentionally allowed to leave a pulse shape difference with the master enable signal MENB as a margin in the second shaping process.

Further, in the present embodiment, other effects and advantages are the same as those in the second embodiment.

Fourth Embodiment

Figure 13:
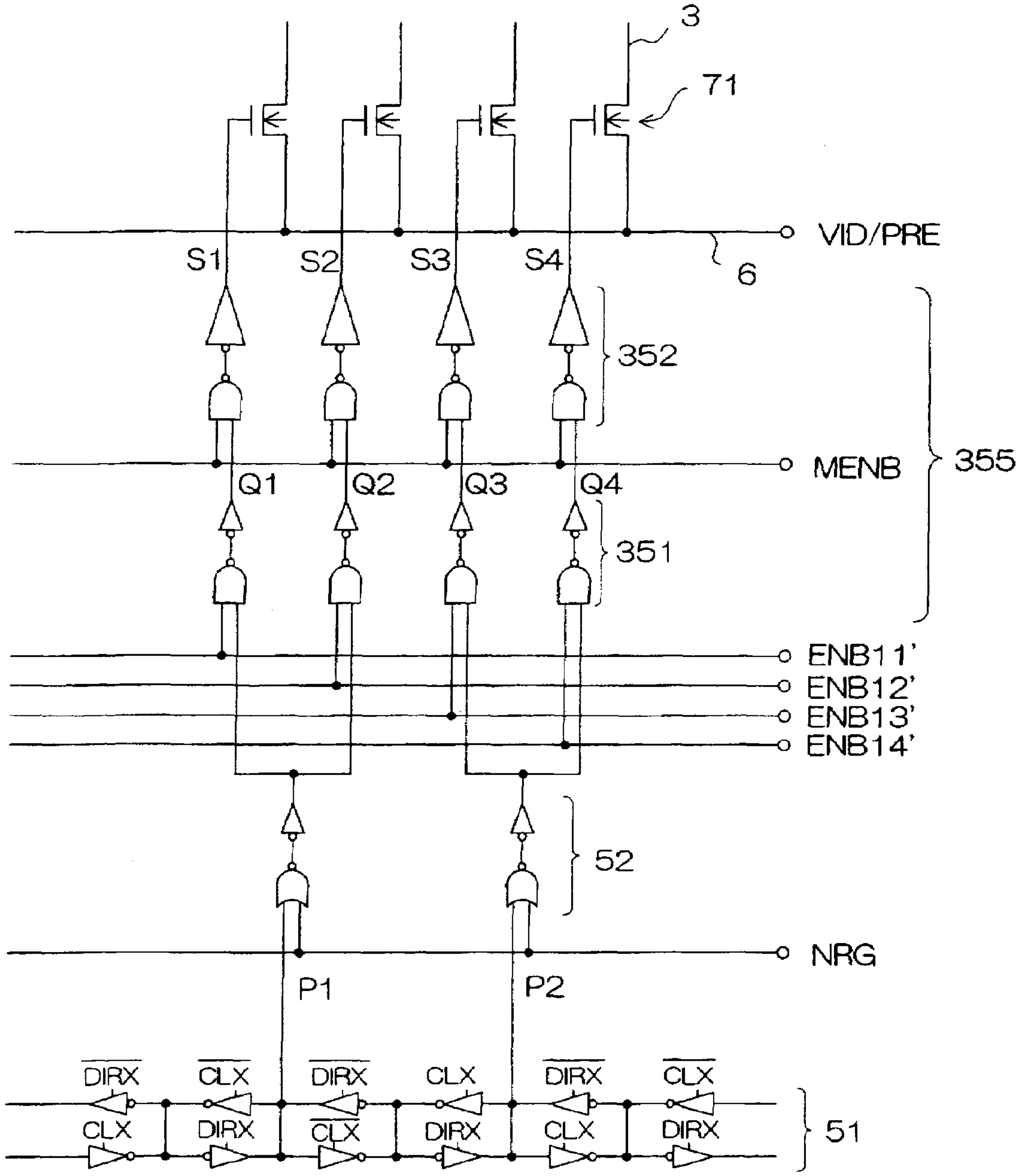
FIG. 13 is a circuit diagram showing a configuration of a data line driving circuit in a liquid crystal device according to a fourth embodiment of the invention.
Figure 14A:
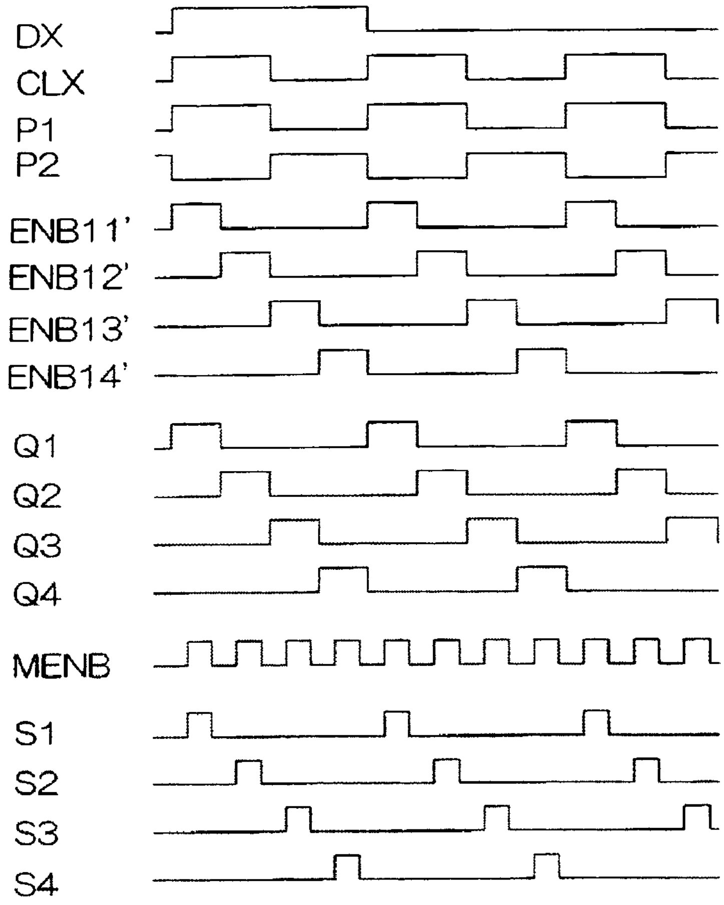
FIG. 14 is a timing chart for a driving circuit shown in FIG. 13.
Figure 14B:
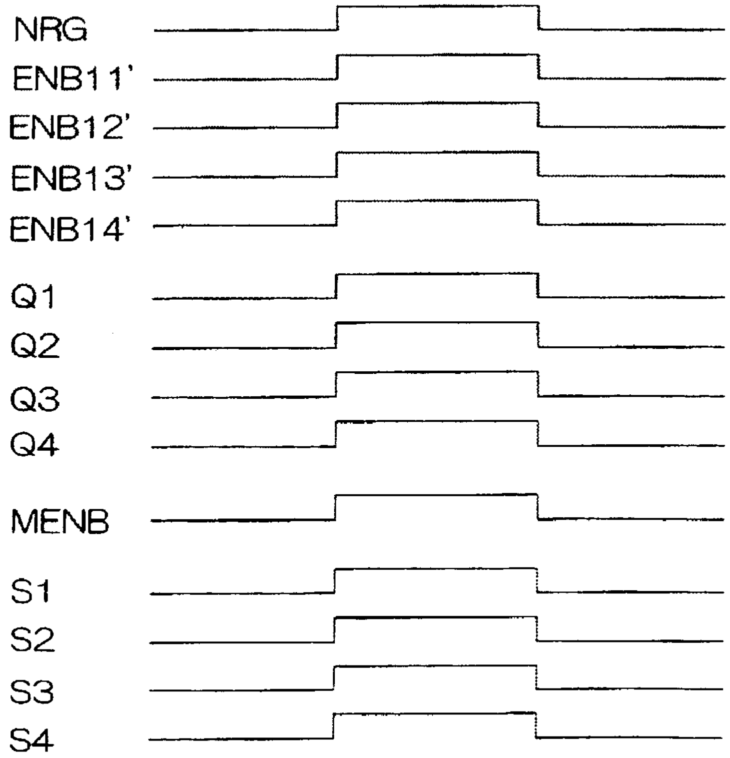

Next, a fourth embodiment will be described with reference to FIGS. 13 and 14B. FIG. 13 shows the configuration of a data line driving circuit of a liquid crystal device according to the present embodiment. FIGS. 14A and 14B show timing charts corresponding to a data writing period and a precharge period, respectively.

In the present embodiment, the data line driving circuit is constituted as a mixture of the first embodiment and the third embodiment. Here, the enable circuit 355 includes the logic circuits 351 and the 352, like the enable circuit 255 of the third embodiment. However, the precharge switch 52 having OR circuits is used, like the first embodiment, and thus, each logic circuit 351 in the enable circuit 355 is constituted by the AND circuit, as shown in the drawing.

Accordingly, the enable signals ENB11' to ENB14' inputted to the logic circuit 351 are not inputted while being inverted, unlike the third embodiment, and thus waveforms which are exactly inverted from the enable signals ENB11 to ENB 14 are obtained. Other parts can be driven, like the third embodiment.

Accordingly, other effects and advantages in the present embodiment are the same as those in the first and third embodiments.

Fifth Embodiment

Figure 15:
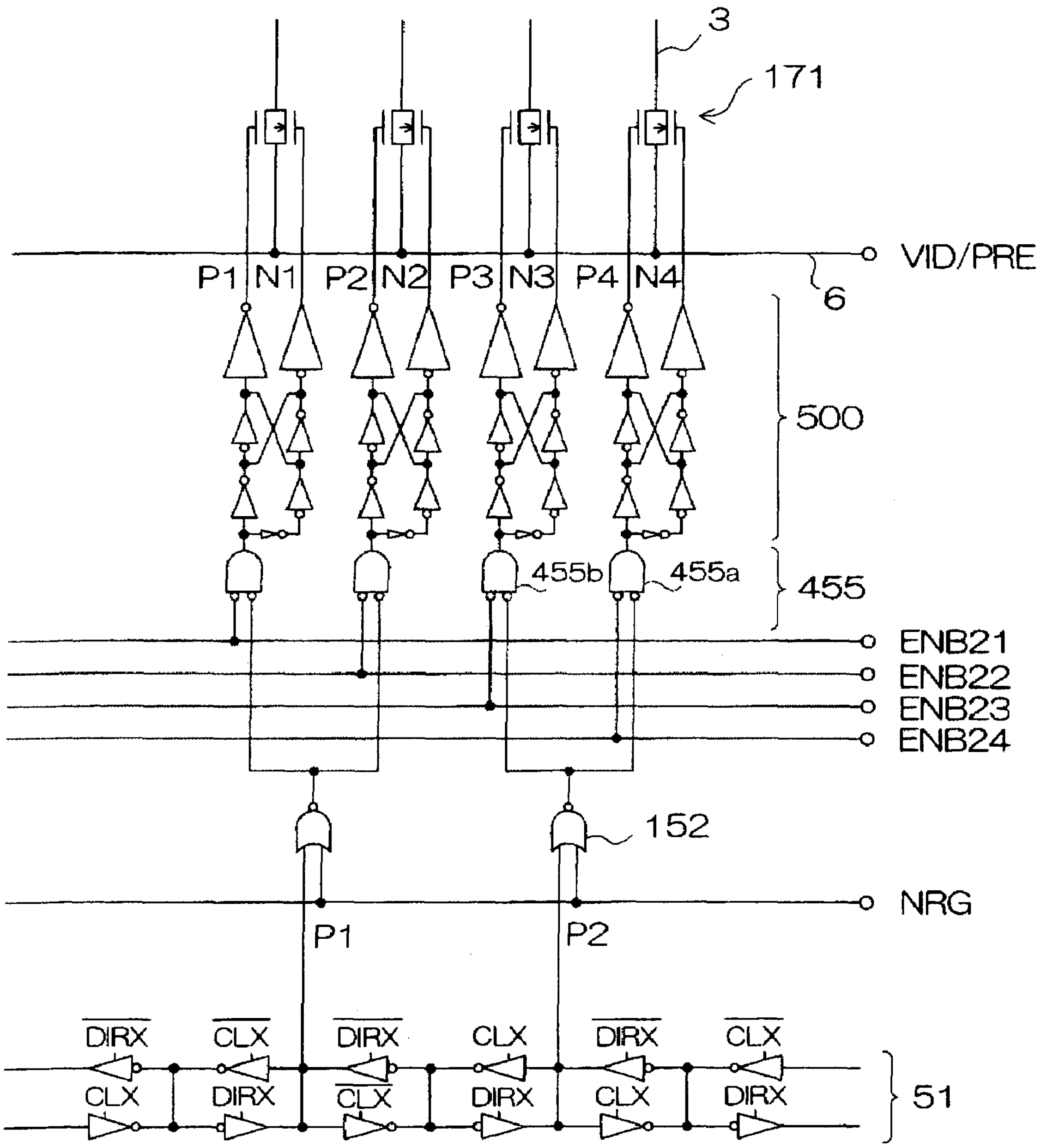
FIG. 15 is a circuit diagram showing a configuration of a data line driving circuit in a liquid crystal device according to a fifth embodiment of the invention.
Figure 16A:
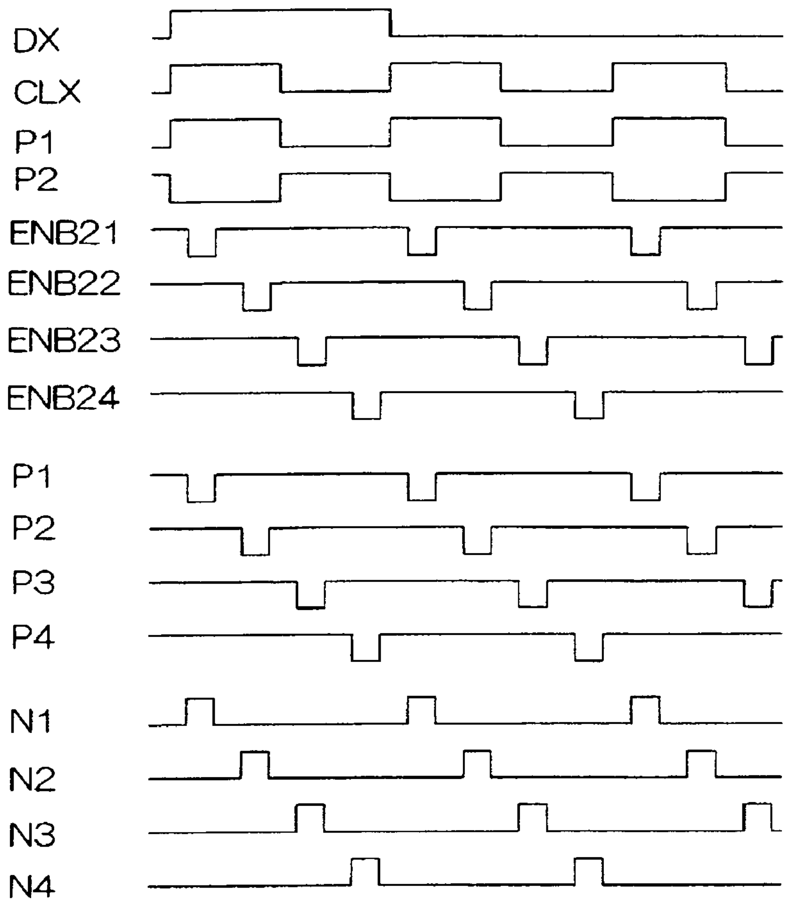
FIG. 16A is a timing chart of the driving circuit shown in FIG. 15.
Figure 16B:
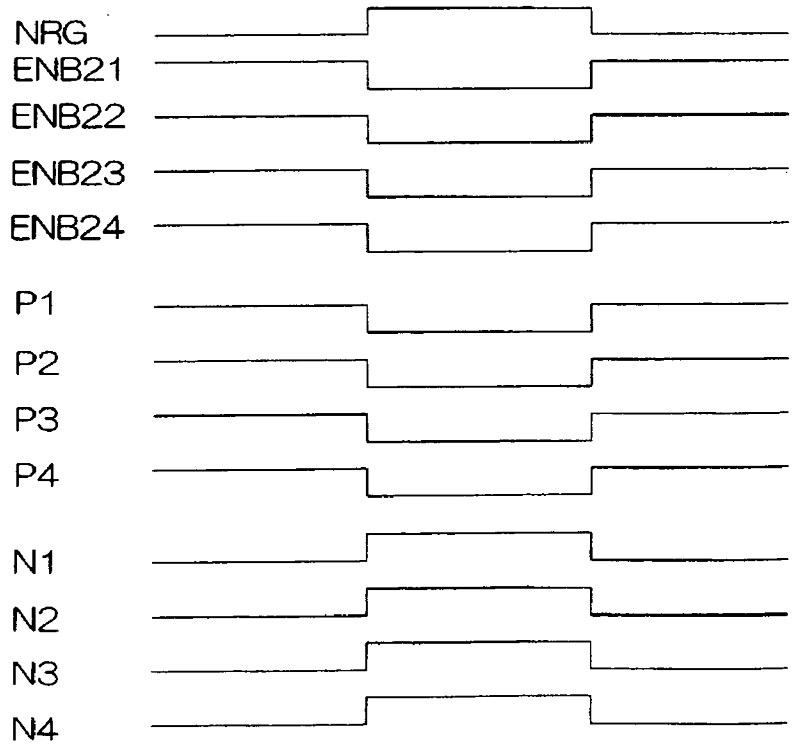
FIG. 16B is a timing chart of the driving circuit shown in FIG. 15.

Next, a fifth embodiment will be described with reference to FIGS. 15 and 16B. FIG. 15 shows the configuration of a data line driving circuit of a liquid crystal device according to the embodiment. FIGS. 16A and 16B show timing charts corresponding to a data writing period and a precharge period, respectively.

The data line driving circuit in the present embodiment is constituted by modifying the second embodiment, except that the sampling circuit is complementary as follows. That is, like the second embodiment, a precharge switch 152 having the NOR circuit is used. Accordingly, the logic circuits 455A and 455B in the enable circuit 455 have the NOR circuit, like the logic circuits 155A and 155B.

But, here, since the sampling circuit has a complementary-type sampling switch 171, the logic circuits 455A and 455B need to generate two sampling circuit driving signals for each sampling switch 171. For this reason, a driving signal generating circuit 500 is provided at the output end of each of the logic circuits 455A and 455B. The driving signal generating circuit 500 has a function of generating and outputting the sampling circuit driving signal Ni (where i=1, . . . , 2n) of the same waveform as the input signal and the sampling circuit driving signal Pi (where i=1, . . . , 2n) which is an inverted signal. The sampling circuit driving signals Ni and Pi generated on the basis of the same input signal are inputted to the gates of a p-type TFT and n-type TFT of one sampling switch 171.

The data line driving circuit of the present embodiment can be driven, like the second embodiment, except that the complementary signal is inputted to the complementary-type sampling switch 171. That is, as shown in FIGS. 16A and 16B, the sampling circuit driving signal Ni of the same waveform is inputted, instead of the sampling circuit driving signal Si in the second embodiment. At the same time, the sampling circuit driving signal Pi is inputted. The sampling switch 171 is driven by the two inputs.

Accordingly, other effects and advantages in the present embodiment are the same as the second and third embodiments.

As described above, the embodiments of the invention are specifically described, but the invention is not limited thereto and various modifications can be made. For example, in the respective embodiments, it is described that the circuit in the back of the shift register 51 is made to be multi-series. In such a case, if the invention is applied, the number of elements of the precharge circuit can be reduced, and thus the effect of the circuit layout is exhibited. Of course, thee invention can be applied to the driving circuit which is not in multi-series.

Further, in the above embodiment, it is described the case of adopting a driving method which performs precharging by integrating all the data lines 3 ahead of the data writing period.

However, precharging may be performed for each one data line or for every predetermined number data lines. Further, the writing operation may be performed.

<Electronic Apparatus>

The liquid crystal device described above is applied to, for example, a projector. Here, the projector which uses the liquid crystal device of the prevent embodiment as a light valve is described.

Figure 17:
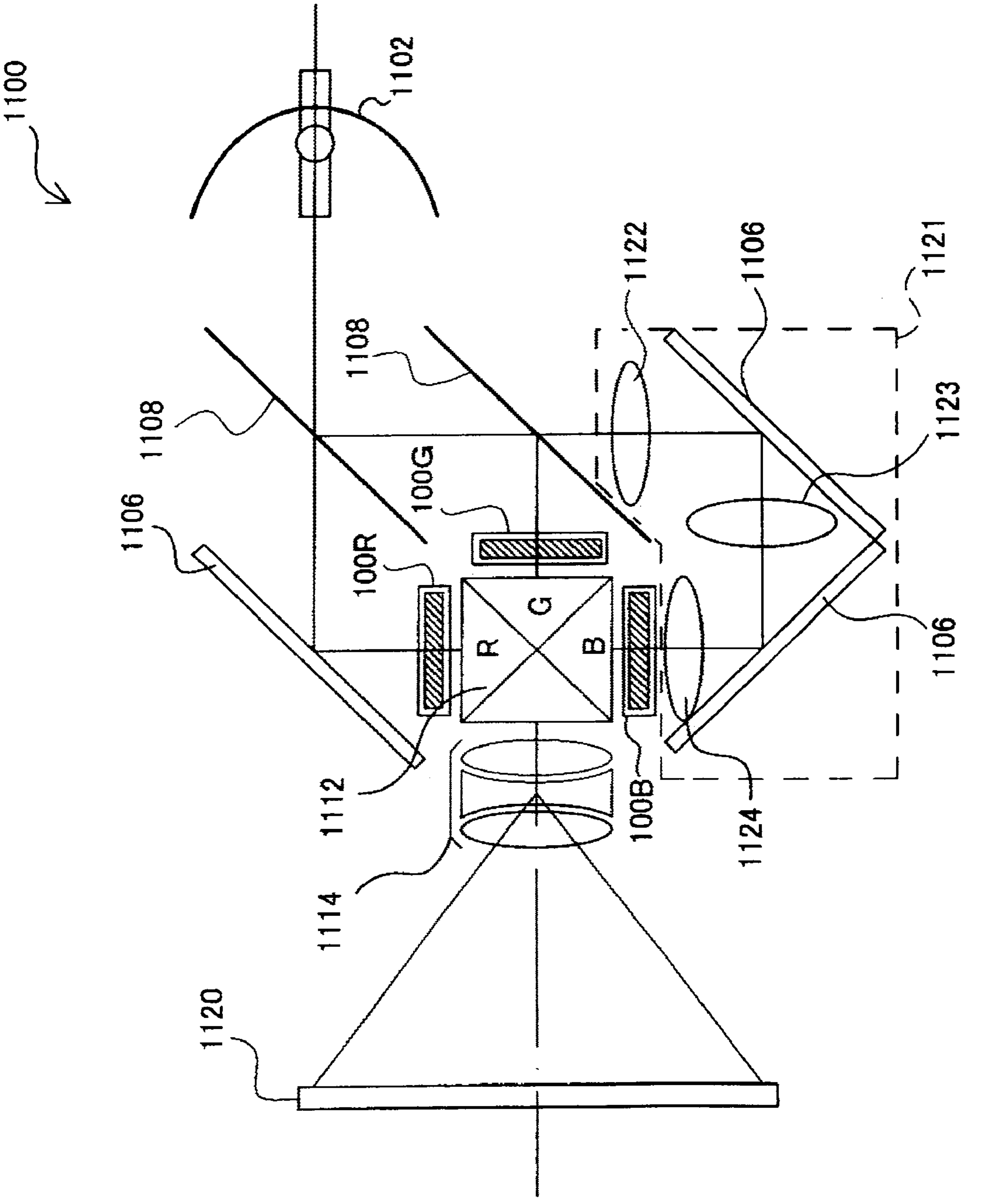
FIG. 17 is a cross-sectional view showing a configuration of a projector as an example of an electronic apparatus to which the electro-optical device of the invention is applied.

FIG. 17 is a plan view showing an example of the configuration of the projector. As shown in FIG. 17, a lamp unit 1102, which has a white light source, such as a halogen lamp or the like, is provided in the projector 1100. Projected light from the lamp unit 1102 is divided into light components of three primary colors of RGB by four mirrors 1106 and two dichroic mirrors 1108 disposed in a the light guide. The light components of three primary colors are incident on liquid crystal devices 100R, 100B, and 100G, which serves as the light valves corresponding to the respective primary colors, respectively. The configurations of the liquid crystal devices 100R, 100B, and 100G are the same as the above-described liquid crystal device and, with the liquid crystal devices 100R, 100B, and 100G, the signals of the primary colors of R, G, and B supplied from the image signal processing circuit are modulated. The light components modulated by the liquid crystal devices are incident on the dichroic prism 1112 from three directions. In the dichroic prism 1112, the images of the respective colors are synthesized to be projected as a color image. The color image is projected onto a screen 1120 through a projection lens 1114.

In the projection-type color display device, high-quality display with little luminance spots or with no luminance spot can be realized by using the liquid crystal device of the above-described embodiments.

Further, the liquid crystal device of the embodiment can be applied to a direct-view-type or a reflection-type color display device, in addition to the projector. In this case, the RGB color filters, together with a protective film, may be formed in a region facing the pixel electrode 9A on the counter substrate 20. Alternatively, a color filter layer made of color resist may be formed below the pixel electrode 9A which faces RGB on the TFT array substrate 10. Further, in each case, if a microlens corresponding to each pixel is provided on the counter substrate 20, condensing efficiency of incident light can be enhanced and also display luminance can be enhanced. Further, several interference layers with different refractive indexes may be deposited on the counter substrate 20, and thus a dichroic filter may be formed to form the RGB colors with the light interference. According to the counter substrate with the dichroic filter, more bright display can be performed.

As described above, the invention is described by way of the liquid crystal device and the liquid crystal projector, but the invention can be applied to the electro-optical device of a matrix driving method, in addition to the liquid crystal device. The electro-optical device can include an electroluminescent device, an electrophoretic device, a display device using an electron emission element (Field Emission Display and Surface-Conduction Electron-Emitter Display), or the like. Further, the electronic apparatus of the invention can be implemented with the electro-optical device of the invention. In addition to the above-described projector, various electronic apparatus, such as a television set, a view finder-type or monitor-direct-view-type video tape recorder, a car navigation device, a pager, an electronic organizer, a word processor, a work station, a video phone, a POS terminal, an apparatus having a touch panel, or the like, can be implemented.

It should be understood that the invention is not limited to the above-described embodiments, and various modifications can be made within the scope without departing from the subject matter or spirit of the invention as defined by the appended claims and the entire specification. Therefore, a driving circuit for an electro-optical device, an electro-optical device having such a driving circuit for an electro-optical device, and an electronic apparatus that accompany such modifications still fall within the technical scope of the invention.

What is claimed is:

1. A driving circuit for an electro-optical device which drives an electro-optical device having a plurality of data lines and a plurality of scanning lines extending to cross each other, and a plurality of pixel electrodes arranged in an image display region corresponding to intersections of the data lines and the scanning lines, the driving circuit for an electro-optical device comprising:

a shift register that has stages each of which generates a transfer signal for defining writing timing and sequentially outputs the transfer signal from the corresponding stages;

a precharge supply line that supplies a precharge timing signal for defining precharge timing ahead of the writing timing;

a precharge circuit that receives the precharge timing signal and outputs a timing signal; and a data line circuit that receives the timing signal, shapes the timing signal on the basis of at least the transfer signal, and drives the plurality of data lines according to the timing signal, the data line circuit including:

a first enable supply line that supplies plural series of first enable signals having a first pulse width narrower than that of the timing signal outputted based on at least the transfer signal;

a second enable supply line that supplies one series of second enable signals having a second pulse width narrower than the first pulse width; and an enable circuit to which the timing signal and the first and second enable signals are inputted, that shapes the respective pulses of the timing signal on the basis of the plural series of first enable signals to limit the pulse width of the timing signal to the first pulse width, and that shapes all pulses of the timing signal on the basis of the one series of second enable signals, after being limited to the first pulse width, so as to limit the pulse width of the timing signal to the second pulse width.

2. The driving circuit for an electro-optical device according to claim 1, wherein the precharge circuit has a plurality of precharge switches that are provided corresponding to the respective stages, and the data line circuit is commonly and electrically connected to the precharge switches and is plurally divided on the basis of unit circuits that are branched into m series (where m is a natural number of two or more) to be electrically connected to m data lines among the plurality of data lines.

3. The driving circuit for an electro-optical device according to claim 1, wherein the transfer signal is directly inputted to the precharge circuit from the shift register.

4. The driving circuit for an electro-optical device according to claim 1, wherein the precharge circuit has a plurality of NOR circuits that are provided corresponding to the respective stages.

5. The driving circuit for an electro-optical device according to claim 1, wherein the precharge circuit is arranged close to the shifter register along one side of the image display region.

6. An electro-optical device comprising:

the driving circuit for an electro-optical device according to claim 1;

a plurality of data lines and a plurality of scanning lines; and a plurality of pixel electrodes.

7. An electronic apparatus comprising the electro-optical device according to claim 6.

8. A driving method of an electro-optical device which is applied to a driving circuit for an electro-optical device for driving an electro-optical device, the electro-optical device having a plurality of data lines and a plurality of scanning lines that extend to cross each other, and a plurality of pixel electrodes arranged in an image display region corresponding to intersections of the data lines and the scanning lines, and the driving circuit for an electro-optical device having a shift register that has stages each of which generates a transfer signal for defining writing timing and sequentially outputs the transfer signal from the respective stages, a precharge supply line that supplies a precharge timing signal for defining precharge timing ahead of the writing timing, and a data line circuit that receives a timing signal, shapes the timing signal on the basis of at least the transfer signal, and drives the plurality of data lines according to the timing signal, the driving method of the electro-optical device comprising:

causing the shift register to sequentially output the transfer signal for defining writing timing;

causing the precharge supply line to supply the precharge timing signal for defining precharge timing ahead of write timing;

causing a precharge circuit to output an input signal as the timing signal when any one of the precharge timing signal and the transfer signal is inputted;

causing the data line circuit to shape the timing signal outputted based on at least the transfer signal; and causing the data line circuit to drive the plurality data line according to the timing signal;

wherein, in causing the timing signal to be shaped, the data line circuit is supplied with plural series of first enable signals having a first pulse width narrower than that of the timing signal outputted based on at least the transfer signal and one series of second enable signals having a second pulse width narrower than the first pulse width, and shapes respective pulses of the timing signal on the basis of the plural series of first enable signals so as to limit the pulse width of the timing signal to the first pulse width and shapes all pulses of the timing signal on the basis of the one series of the second enable signals after being limited to the first pulse width so as to limit the pulse width of the timing signal to the second pulse width.

9. A driving method of an electro-optical device which is applied to a driving circuit for an electro-optical device for driving an electro-optical device, the electro-optical device having a plurality of data lines and a plurality of scanning lines that extend to cross each other, and a plurality of pixel electrodes arranged in an image display region corresponding to intersections of the data lines and the scanning lines, and the driving circuit for an electro-optical device having a shift register that has stages each of which generates a transfer signal for defining writing timing and sequentially outputs the transfer signal from the respective stages, a precharge supply line that supplies a precharge timing signal for defining precharge timing ahead of the writing timing, and a data line circuit that receives a timing signal, shapes the timing signal on the basis of at least the transfer signal, and drives the plurality of data lines according to the timing signal. the driving method of an electro-optical device comprising:

causing the shift register to sequentially output the transfer signal for defining writing timing;

causing a precharge supply line to supply the precharge timing signal for defining precharge timing ahead of write timing;

causing the precharge circuit to output an input signal as the timing signal when any one of the precharge timing signal and the transfer signal is inputted;

causing the data line circuit to shape the timing signal outputted based on at least the transfer signal; and causing the data line circuit to drive the plurality data line according to the timing signal;

wherein, in causing the precharge circuit to output the input signal as the timing signal, the transfer signal is directly inputted to the precharge circuit from the shift register.

10. The driving method according to claim 9, wherein, in causing the timing signal to be shaped, the data line circuit is supplied with an enable signal having a predetermined pulse width narrower than that of the timing signal outputted based on at least the transfer signal and shapes the timing signal by limiting the pulse width to the predetermined pulse width.

* * * * *